United States Patent [19]

Marshall et al.

[11] 3,836,876

[45] Sept. 17, 1974

[54] ACOUSTIC SURFACE WAVE DEVICES

[75] Inventors: Frank Graham Marshall; Edward George Sydney Paige, both of West Malvern, England

[73] Assignee: The Secretary of State for Defence in Her Britannic Majesty's Government of the United Kingdom of Great Britain and Northern Ireland, London, England

[22] Filed: May 2, 1972

[21] Appl. No.: 249,573

[30] Foreign Application Priority Data

May 5, 1971 Great Britain .................... 13125/71

[52] U.S. Cl. ........................ 333/30, 310/9.8, 333/7, 333/11, 333/14, 333/72

[51] Int. Cl. .............................................. H03h 7/30

[58] Field of Search ............... 333/30, 7, 11, 72, 14; 310/9.8

[56] References Cited

UNITED STATES PATENTS

| | | | |
|---|---|---|---|
| 3,500,461 | 3/1970 | Epstein et al. | 333/30 R |
| 3,551,837 | 12/1970 | Speiser et al. | 310/9.8 |
| 3,568,102 | 3/1971 | Tseno | 310/9.8 |
| 3,582,838 | 6/1971 | De Vries | 310/9.8 |
| 3,600,710 | 8/1971 | Adler | 333/30 |
| 3,626,309 | 12/1971 | Knowles | 333/30 |
| 3,633,118 | 1/1972 | Means | 333/30 |
| 3,662,293 | 5/1972 | De Vries | 310/9.8 |
| 3,678,305 | 7/1972 | Paige | 310/9.8 |
| 3,713,049 | 1/1973 | Desormiere | 333/30 M |

*Primary Examiner*—Archie R. Borchelt
*Assistant Examiner*—Saxfield Chatmon, Jr.
*Attorney, Agent, or Firm*—Elliott I. Pollack

[57] ABSTRACT

Acoustic surface wave devices of a novel class characterized by the provision of coupling means comprising at least several spaced filamentary electrical conductors extending over a first region and a second region for causing acoustic surface waves propagated across the coupling means in the first region to interact with acoustic surface waves propagated across the coupling means in the second region, by means of alternating electric signals induced on the filamentary electric conductors. The regions to be coupled are preferably formed on piezoelectric material, but modified forms of the coupling means can be made operable with other materials and suitable biassing fields. The described devices include acoustic beam width changing, impedance matching, track changing and phase-sensitive switching devices; a hybrid junction device, resonator and recirculating filter devices, tapped acoustic delay lines, unidirectional transducers, acoustic surface wave reflectors and mode discriminators, electrically-controlled acoustic beam switches and directional couplers, acoustic beam splitters, and means for reducing unwanted reflections of acoustic surface waves.

36 Claims, 39 Drawing Figures

ACOUSTIC SURFACE WAVE DEVICES

BACKGROUND OF THE INVENTION

The present invention relates to acoustic surface wave and acoustic interface wave devices. The term 'acoustic surface waves' will be used hereinafter to include acoustic interface waves as well as acoustic surface waves.

Acoustic surface wave devices are being proposed for an increasingly large number of electronic purposes, and acoustic surface wave filters and delay lines are likely to find important applications in the future. Such devices commonly comprise a transducer for launching acoustic surface waves along a predetermined track (which must be along a surface or an interface of a material capable of supporting acoustic surface waves, but need not have any other particular configuration or boundaries) and at least one other transducer for detecting the acoustic surface waves and generating electrical signals in response to the acoustic surface waves. The transducers used conventionally comprise interdigitated comb-like electrodes. If such electrodes are deposited on a piezoelectric material, the application of alternating electric signals of suitable frequency across the electrodes will tend to propagate an acoustic surface wave orthogonal to the interleaved digits of the comblike electrodes. Conversely, the passage of an acoustic surface wave orthogonal to the digits will induce a corresponding alternating electrical signal between the electrodes. It is also known that such transducers can operate effectively on an electrostrictive material, if a biassing electric field is applied to the material under the transducers. The transducers may be designed to achieve filtering effects.

It is an object of the invention to provide means for coupling acoustic surface waves, so that a desired portion or substantially all of the energy in an acoustic surface wave in a first region can be transferred to acoustic surface waves in a second region. A further object of the invention is to form various novel devices incorporating one or more of such coupling means which form components having useful properties, and may be used either to achieve novel or improved technical effects or as alternatives to known electronic components.

SUMMARY OF THE INVENTION

According to the present invention there is provided an acoustic surface wave device including material of the kind able to support acoustic surface waves, the said material extending at least over a first region and over a second region of the device, and including an acoustic surface wave coupling means which comprises at least several spaced filamentary electrical conductors, formed over a surface of the said material and extending over the first region and over the second region, for causing acoustic surface waves propagated in a path crossing the parts of the filamentary conductors in the first region to interact with acoustic surface waves propagated in a path crossing the parts of the filamentary conductors in the second region, by means of alternating electric signals induced between the filamentary electric conductors.

The said material may be a piezo-electric material, in which case the coupling means may simply consist of the plurality of filamentary electrical conductors extending over the first region in a direction orthogonal to the direction of the acoustic surface waves in the first region, and extending over the second region in a direction orthogonal to the acoustic surface waves in the second region. The filamentary electrical conductors need not have any electrical interconnections.

Alternatively, the said material may be an electrostrictive material, in which case the coupling means must also include means for applying a biassing electric field to the material under the filamentary conductors in the first region and in the second region. Arrangements using electrostrictive material in a similar manner have been more fully described in Paige U.S. Pat. No. 3,678,305, issued July 18, 1972, for "Acoustic Surface Wave Devices."

As another alternative the coupling means may utilize the electric motor effect. In this case the filamentary conductors are connected at their ends to form closed circuits, and means are provided for maintaining a magnetic field, orthogonal to the filamentary conductors, over each of the regions where the interactions are required.

As yet another alternative, the coupling may utilize the magnetostrictive effect. In this case the said material must be a magnetostrictive material which does not short-circuit the electric signals induced on the filamentary conductors, the filamentary conductors are connected at their ends to form closed circuits and means are provided for applying a biasing magnetic field to the material in the first region and the second region.

The device may be formed on a surface of any piece of suitable material, or on a thin layer of suitable material deposited on a substrate, or it may be formed on any substrate able to support acoustic surface waves with a thin film, of suitable material for achieving the desired form of coupling action, deposited on the substrate only over regions where a coupling action is desired.

The device may be covered with a film or layer of protective material, thus covering the surface on which the conductors are deposited. Care should be taken to avoid using any protective material which would cause excessive damping of the acoustic surface waves.

The coupling means may be disposed to couple acoustic surface waves occurring in two regions on a single acoustic surface wave track, or to couple acoustic surface waves occurring in particular regions of two discrete acoustic surface wave tracks, which need not be of equal width, although coupling between tracks of equal width gives maximum efficiency.

Connecting portions of the plurality of filamentary conductors may be formed over a material which absorbs or does not support acoustic surface waves; this may advantageously be a pad of a material having a low dielectric constant.

The simplest, and preferred form of coupling is the piezoelectric form. The descriptions and explanations hereinafter given refer to embodiments having peizoelectric coupling, that is to say having at least a layer of piezoelectric material or bulk piezoelectric material over or under each of their transducers and regions where electroacoustic coupling is required, except where a specific reference to some other form of coupling is made. However, it should be remembered that in most cases corresponding structures could be formed using the alternative forms of coupling described hereinabove.

BRIEF DESCRIPTION OF THE DRAWINGS

Various embodiments of the invention using piezoelectric coupling means will now be described by way of example, with reference to the accompanying drawings, of which:

FIG. 37 is a perspective view of an electronic component for the device of which FIG. 36 is a circuit diagram.

DESCRIPTION OF THE PREFERRED EMBODIMENTS

Figure 1:
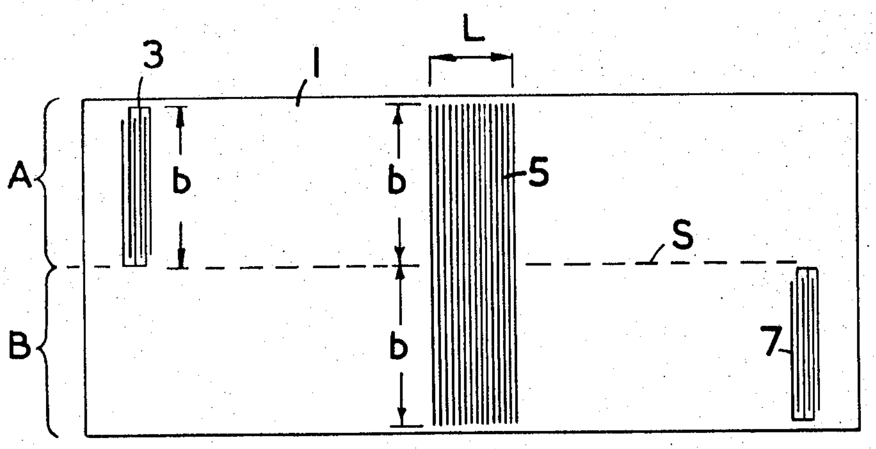
FIG. 1 is a plan view of a coupler designed to transfer the energy of acoustic surface waves from one track to an adjacent track on the same substrate.

FIG. 1 is a plan view of a coupler designed to transfer acoustic surface waves from one track A to an adjacent parallel track B on the same substrate 1. The acoustic surface wave substrate 1 may be a piezoelectric material such as quartz, lithium niobate, or lithium germanate; a thin film of aluminium nitride deposited on a non-piezoelectric single-crystal substrate, or a thin film of piezoelectric material, for instance zinc, oxide sputtered on a non-piezoelectric amorphous substrate, for instance glass. Alternatively the various transducers and coupler elements shown may be formed on a non-piezoelectric substrate which is able to support acoustic surface waves (for instance glass) with a thin film of piezoelectric material, for instance zinc oxide, sputtered or otherwise deposited either over or under the transducers and coupler elements in order to make them effective.

An interdigital comb transducer 3 is formed on the substrate 1 in a position suitable for launching acoustic surface waves along the track A. An acoustic surface wave coupler 5 is deposited on the substrate 1. The coupler 5 consists of a plurality of vapor-deposited filamentary conductors, each of length $2b$, spaced parallel to each other and aligned at right angles to the acoustic tracks A and B. The broken line S represents a line of symmetry bisecting the coupler 5 and extending parallel to the tracks A and B. The filamentary conductors of the coupler 5 may be separated by equal spaces, by monotonically varied spaces, or by spaces varied in any regular or random manner. A second interdigital comb transducer 7 is formed on the substrate 1 in the track B towards the end of the track B which is further from the transducer 3 than the coupler 7. The transducers 3 and 7 will have conventional electrical connections (not shown) to external circuits, but the filamentary conductors of the coupler 5 need not have any external connections and should be electrically insulated from each other. It should be noted that FIG. 1 and the other plan drawings are schematic, in as much as they do not attempt to show the width of each filamentary conductor or to show the required number of filamentary conductors accurately.

It has been found that when acoustic surface waves are coupled to an array of filamentary conductors extending across the path of the acoustic surface waves, alternating electric fields are set up between adjacent conductors, which can induce acoustic surface waves in any other acoustic surface wave track crossed by the array of filamentary conductors. In the simplest case of an array such as the coupler 5, the two halves of the array on opposite sides of the line of symmetry S act as coupled structures, and tend to exchange energy from waves propagated under one half to waves propagated under the other half, and then vice versa, as the waves proceed.

This effect can be explained by a theory that acoustic surface waves can propagate in piezoelectric material under an array of filamentary conductors orthogonal to the direction of propagation, in two main modes, namely a symmetric mode and an antisymmetric mode. In the symmetric mode the waves under both halves of the array are in phase with each other and their amplitude is constant across the whole width of the array. In the antisymmetric mode, the signals under the two halves of the array are of equal amplitudes, but have an antiphase relationship with each other. When an antisymmetric mode wave is combined with a symmetric mode wave of the same amplitude, the result resembles an acoustic surface wave under one half of the array only, the two modes having a null effect under the other half. Hence excitation by an acoustic surface wave arriving under one half only of the array is effectively divided equally between the symmetric mode and the antisymmetric mode. However, the antisymmetric mode wave causes currents to flow along the filamentary conductors, and therefore propagates with a slower velocity than the symmetric mode. The phase relationship between the symmetric mode and the antisymmetric mode therefore changes as the signals advance; this has an effect equivalent to a transfer of energy from the acoustic surface wave arriving in track A under one half of the coupler, to form a new acoustic surface wave in track B under the other half of the coupler. When both waves have travelled a distance, hereinafter called L, which is sufficient to cause the phase relationship between the symmetric mode signal and the antisymmetric mode signal to change by $\pi$ radians, substantially all the energy originally in the track A will be transferred to track B. If the array extends further, and the waves are allowed to continue propagating under it without interference for a further distance L, then (neglecting dissipation in the track) substantially all the energy will be transferred back to the track A again. It follows that for the purpose of the transferring energy from the acoustic surface wave in track A to track B, the coupler 5 should be made to extend for a distance L (or an odd multiple of L) in the direction of propagation of the waves. The length L can be at least approximately calculated as follows, for the case of a coupler having equally spaced conductors, formed on piezoelecrtric material $$L = N_T d$$

$$N_T = \pi/FK^2\ \theta/1 - \cos\theta$$

where $\theta = \alpha\ \omega\ d/s$, $N_T$ is the number of conductors required for maximum energy transfer, $\omega$ is angular frequency, $d$ is the spacing between the centers of adjacent filamentary conductors, $s$ is the velocity of the acoustic surface waves, $K$ is the electromechanical coupling constant, and $F$ and $\alpha$ are factors dependent on the material and on the ratio of the width of the filamentary conductors to the width of the spaces between them.

For Y-cut, lithium niobate with conductors as wide as the spaces between them, arranged to propagate the acoustic surface waves parallel to the crystal Z axis, $\alpha = 0.75$ and $F = 0.85$.

Under the same conditions the general behaviour of a coupler having N wires is specified by a scattering matrix M:

$$M = \begin{Bmatrix} 0 & a & 0 & b \\ a & 0 & b & 0 \\ 0 & b & 0 & a \\ b & 0 & a & 0 \end{Bmatrix}$$

where $a = (1 - k_N^2)^{1/2}$ $b = ik_N$ and $K_N = \sin(1/2NFK^2(1 - \cos\theta)/\theta)$.

This coupling action applies over a wide frequency range, limited by a stop band which occurs when the spacing of the conductors becomes approximately equal to one half of the wavelength of acoustic surface waves in the material. (The above formula does not apply in the stop band). The bandwidth may be increased by spacing the conductors unequally or randomly. In such cases the formula for $N_T$ should be slightly modified but still remains approximately true; $L$ will be $N_T$ times the mean spacing of the conductors.

Where electrostrictive coupling, or motor effect couping is used, different constants will be appropriate. In the electrostrictive case the constants become functions of the biasing field applied.

The coupling action of the array is only slightly modified if the array is curved, or the operative parts of the array spaced apart — that is to say if the filamentary conductors have intermediate portions required to serve only as electrical interconnections between the parts of the array over the first region and the parts of the array over the second region. However a complete transfer of energy is only possible if the operative width of track A is equal to the operative width of track B (assuming that the tracks arc in the same material). If the two tracks are unequal in width, a modified theory applies, and similar but less efficient results are achieved.

In some of the devices described hereinafter it is beneficial for intermediate portions of the filamentary conductors to have little or no coupling to the substrate on which they are deposited. Such portions will hereinafter be called connecting-portions, or C-portions.

There are various methods of arranging this. One method which is usable on an anisotropic substrate is to arrange that the electromechanical coupling constant $K$ is large in directions in which it is desired to propagate acoustic surface waves compared with its value in directions perpendicular to the C portions.

Alternatively it may be possible to arrange for $K$ to be zero under the C portions. For example, it is possible to make certain piezoelectric ceramic substrates having selected areas where piezoelectric coupling is absent.

Another alternative method relies on velocity mismatch between acoustic surface waves generated beneath C portions. Such mismatch may arise from anisotropy in the crystal or may be arranged by adjustment of the spacing between the wires in the C portions.

Alternatively the C portions may be deposited over pads of silica or other non-piezoelectric material having a low dielectric constant, the pads themselves being deposited on the substrate.

For additional isolation, the pads of low dielectric constant may be deposited over a metal film on the substrate. This shields the substrate from the electric fields between the filamentary conductors.

These portions of the conductors whose function is to act as electrical conductors only will inevitably impose a capacitive load on the coupler. This extra load may be offset by increasing the number of conductors in the coupler, and full compensation is possible by using this technique. The load can however be reduced by the use of silica pads under the portions of the conductors concerned, which produces the further beneficial effect of reducing the coupling between the conductors and the substrate, as stated above.

Whatever the actual length of a coupler the symbol $L$ will be used to denote that length which transfers the maximum amount of energy from one track to a further track. In other words the length hereinafter called $L$ should be understood to include any extra length necessary in any given case due to capacitive loading effects of the kind described above. The expression 'full length multistrip coupler' will be used hereinafter to denote a coupler of length $L$.

It is possible to design a coupler so that the input energy in one track is split equally between two output tracks; this requires a length of $1/2L$. Couplers so designed will hereinafter be called $3dB$ couplers.

It is also possible to design a coupler of suitable length to transfer any desired proportion of the input energy to another track. Couplers designed to transfer a fraction less than half of the input energy to another track will hereinafter be called fractional couplers.

Figure 2:
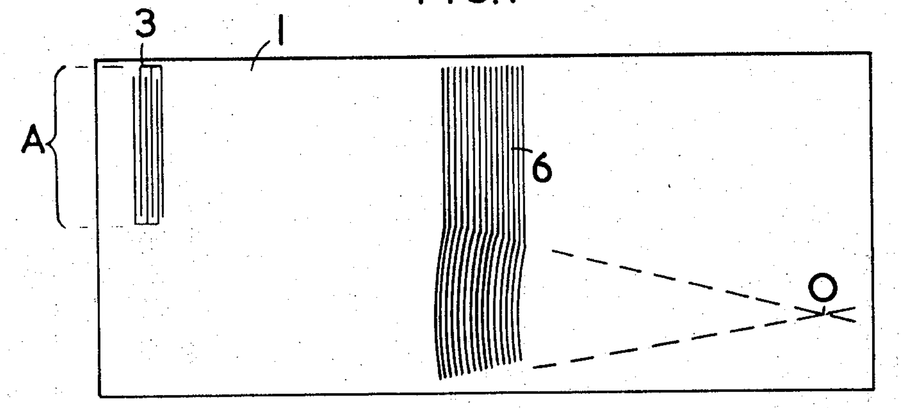
FIG. 2 is a plan view of a coupler designed to transfer the energy of acoustic surface waves from one parallel track to form convergent acoustic surface waves in an adjacent track on the same substrate.

FIG. 2 is a plan view of a device including a coupler 6, designed to transfer acoustic surface waves from a parallel track A to an adjacent convergent track on the same substrate. This coupler is similar to the coupler 5 of FIG. 1 except that the parts of the filamentary conductors crossing the track B are curved forming a series of circular arcs having a common center O. On an anisotropic substrate it may be better to have curves of some non-circular shape; acoustic surface waves will be generated in directions perpendicular to the conductors.

The action of the device is as follows. Acoustic surface waves launched in the track A by the transducer 3 cause electric fields to be set up between adjacent filamentary conductors in the coupler 6 and these fields are transferred to the circular arcuate parts thereof. This causes acoustic surface waves to be generated and propagated in the track B orthogonal to the circular arcs: thus forming acoustic surface waves converging to a focus at the point O. A fine focus may be achieved at the point O by a suitable choice of the forms of the curves in the wires in the track B. One use for a coupler of this kind is to feed acoustic surface waves into an acoustic surface wave waveguide (not shown) at the point O.

Figure 3:
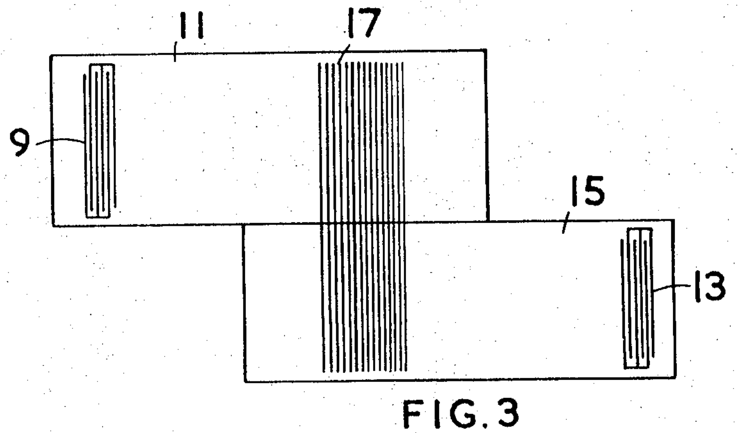
FIG. 3 is a plan view of a coupler designed to transfer the energy of acoustic surface waves from one substrate to an adjacent substrate.

The two operative regions coupled by a multistrip coupler of the kind herein described need not be on the same substrate, as long as the conductors over one region are suitably connected to corresponding conductors over the other region. FIG. 3 shows a plan view of a device including a multistrip coupler arranged to transfer acoustic surface wave energy from one substrate to another. It comprises a first interdigital comb transducer 9 deposited on a first acoustic surface wave substrate 11, and a second interdigital comb transducer 13 deposited on a second acoustic surface wave substrate 15. The substrates 11 and 15 are mounted adjacent to one another (for example, by cementing to a common base) and a full length multistrip coupler 17 is formed across the substrates 11 and 15, between the transducers 9 and 13. If the substrate 15 is identical to the substrate 11 in all respects, then the spacing between the conductors on both substrates can be identical, but otherwise it may be necessary to have different spacings and length $b$ not identical in each track on the two substrates.

Figure 4:
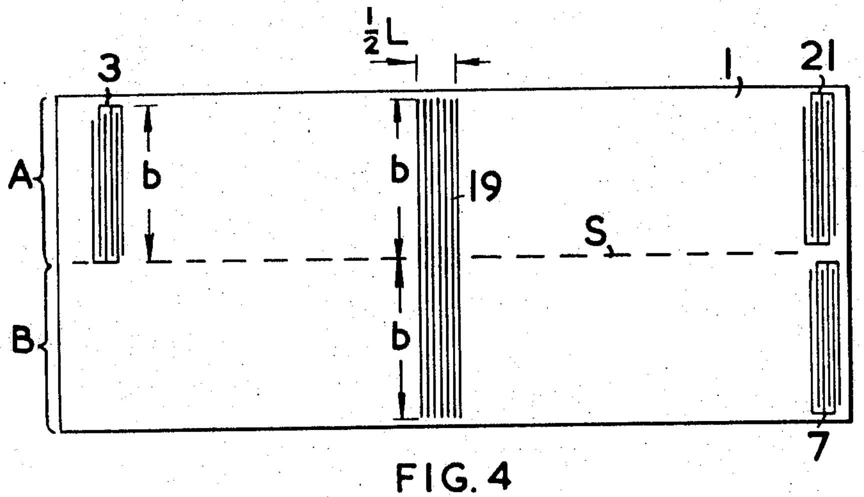
FIG. 4 is a plan view of a coupler designed to divide acoustic surface wave power between two discrete output tracks so as to form acoustic surface waves with a quadrature phase relationship in the two tracks.

FIG. 4 is a plan view of a device including a coupler 19 designed to divide acoustic surface wave power into two output tracks in quadrature. This is a half length or $3dB$ coupler. A third interdigital comb transducer 21 is deposited on the substrate 1 towards the end of the track A further from the transducer 3 than the coupler 19.

The action of the device is as follows. Acoustic surface waves are launched in the track A by the transducer 3. Let $a_3$ represent the amplitude of these waves. When they reach the coupler 19, their energy is split equally between the symmetric mode and the antisymmetric mode. Hence they propagate as a symmetric mode signal of amplitude $1/2a_3$ plus an antisymmetric mode signal of amplitude $1/2a_3$, starting in phase with each other in track A at the leading edge of the coupler 19. In track B, the antisymmetric mode signal is initially equal and opposite to the symmetric mode signal. The length of the $3dB$ coupler 19 is just enough to cause the antisymmetric mode signal to be lagging the symmetric mode signal by $\pi/2$ radians when it reaches the trailing edge of the coupler. Hence the resultant acoustic wave signals leaving the coupler in the tracks A and B have amplitudes equal to $a_3/\sqrt{2}$, and the wave in track B leads the wave in track A by $\pi/2$ radinas. The waves in track A are detected and converted into electrical signals by the transducer 21, and the waves in track B are detected and converted into electrical signals by the transducer 7.

Figure 5:
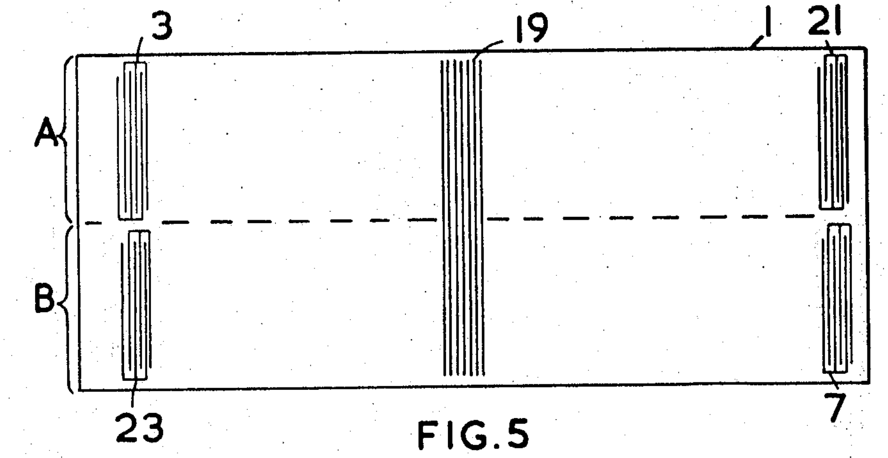
FIG. 5 is a plan view of an acoustic surface wave beam switch designed to produce an acoustic surface wave output in one or the other of two output tracks depending on the sense of an input quadrature phase difference.

FIG. 5 is a plan view of an acoustic surface wave beam switch designed to produce an acoustic surface wave output in one or the other of two output tracks depending on the sense of a quadrature phase difference between two input signals. This beam switch is similar to the device of FIG. 4 but has a fourth interdigital comb transducer 23, deposited on the substrate 1 towards the end of the track B remote from the transducer 7.

The beam switch acts as follows. Suppose that the transducers 3 and 23 produce signals of amplitudes $a_3$ and $a_{23}$ respectively. The action of the coupler 19 in response to the signal $a_3$ produces signals of amplitude $a_3/\sqrt{2}$ in track A and track B, the signal in track B leading the signal in track B by $\pi/2$ radians. Similarly, the signal $a_{23}$ causes the coupler 19 to produce signals in track A and track B of amplitude $a_{23}/\sqrt{2}$, but with the signal in the track A leading by $\pi/2$ radians. Now if the original signals $a_3$ and $a_{23}$ are of equal amplitudes and have a quadrature phase relationship, the resultant output signals from the coupler 19 will cancel out in one track or the other, depending on whether the signal from transducer 3 leads or lags relative to the signal from the transducer 23. Hence the output from the switch may be switched from the transducer 21 to the transducer 7 and vice-versa, by reversing the quadrature phase difference between the signals supplied to the transducer 3 and the transducer 23.

Figure 6:
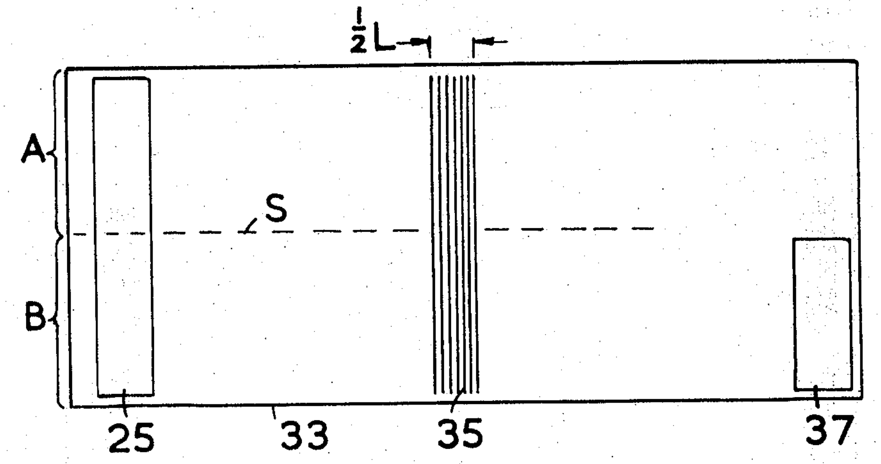
FIG. 6 and FIG. 7 are diagrammatic plan views of alternative acoustic surface wave beam width compressors designed to produce a narrow-beam acoustic surface wave output.

FIG. 6 is a diagrammatic plan view of an acoustic surface wave width compressor designed to produce a narrow-beam acoustic surface wave output. An acoustic surface wave substrate 33 provides two acoustic surface wave tracks A and B, of equal width $b$, on opposite sides of a line S. A source 25 of width $2b$ is provided on the substrate 33 so as to launch acoustic surface waves in both track A and track B. A half-length multistrip coupler 35 is deposited on the substrate 33 so as to embrace the track A and the track B. A receiving device 37 is deposited on the substrate 33 in the track B on the farther side of the coupler 35 from the source 25. The device is so made that the signals arriving at the coupler 35 in the respective tracks A and B are of equal amplitude and in quadrature with one another; this may be arranged in any one of four alternative ways which will now be described.

The first method of ensuring quadrature between the signals is to slow down or speed up acoustic surface waves in one of the tracks by depositing a pad of suitable material, for instance metal, or alternatively any material having elastic properties different from those of the substrate material on one of the tracks.

The second method is to make the source 25 consist of two transducers one being displaced relevant to the other by a quarter wavelength of the acoustic surface waves.

The third method is to make the source 25 consist of two transducers the same distance away from the coupler 35, but driven in electrical quadrature.

Figure 7:
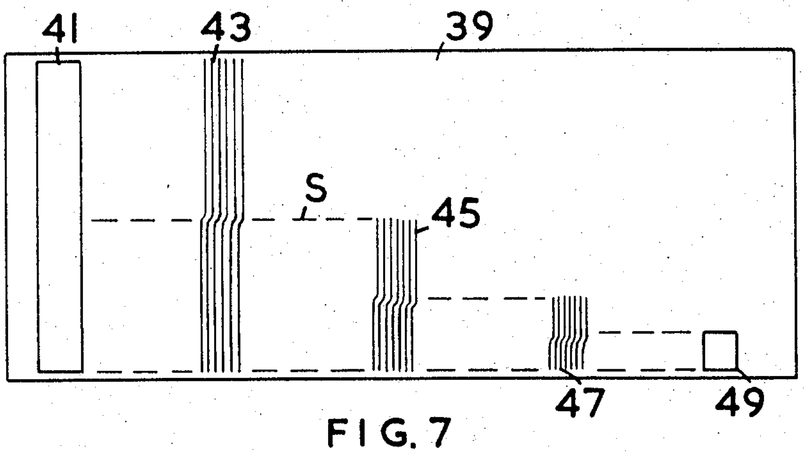

The fourth method is to form the coupler 35 with a step in each of its conductors, so that one half of the coupler is effectively displaced a quarter of an acoustic wavelength along the direction of propagation, as illustrated in the case of the couplers of FIG. 7 described hereinafter.

By any one of these arrangements, it is ensured that the signals reaching the coupler 35 in track B are $\pi/2$ radians in advance of the signals reaching the coupler 35 in track A. By an interaction of the kind described with reference to FIG. 4, the coupler 35 effectively compresses the energy of the waves from tracks A and B to form a single wave in the track B on the output side of the coupler 35.

Clearly, several width-compressors can be cascaded in series, to change the width of the acoustic surface wave by a factor of two at each stage. FIG. 7 shows a three-stage width-compressor comprising three couplers 43, 45 and 57. Each of these couplers has a quarter-wavelength step in the center of each of its filamentary conductors. The block 41 represents a source, and the block 49 represents a receiver of acoustic surface waves. The receiver 49 may be a coupler or a transducer or a waveguide for acoustic surface waves.

By successive width-compressing actions as hereinbefore described, substantially all the energy from the wide source 41 is compressed into a track having one-eighth of the width of the source 41. The device will work equally well in reverse, as a width expander, if 49 is a narrow source and 41 is a wide receiver. The main utility of such a device is for matching acoustic impedances.

Figure 8:
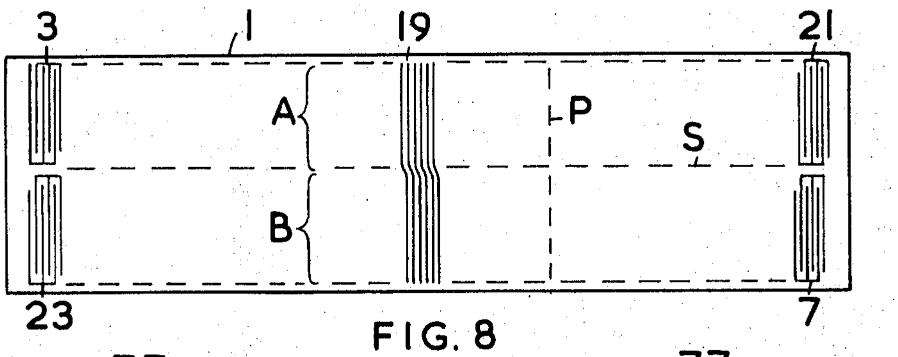
FIG. 8 is a plan view of an acoustic surface wave hybrid junction circuit.

FIG. 8 is a plan view of a coupler device arraned to act as a hybrid junction circuit. Hybrid junction circuits are known both at low frequencies (in the form of inductive circuits) and at microwave frequencies (in the form of magic-tee waveguide junctions), but it is difficult to devise any convenient or practical form for an electrical hybrid junction circuit to operate in a range of commonly used intermediate frequencies. The acoustic surface wave form of hybrid junction circuit should be very useful and convenient in this range of frequencies where the purely electrical or electromagnetic forms of hybrid junction circuit are inconvenient or impractical.

FIG. 8 shows components as in FIG. 5, except that the half-length coupler 19 is formed with a quarter-wavelength step in the center of each of its conductors, in effect displacing one half of the coupler 19 with respect to the other half, by a distance equal to a quarter-wavelength of the acoustic surface waves, so that when waves are launched in phase with each other in the two tracks A and B, the waves in track A will reach the first conductor of the coupler 19 $\pi/2$ radians ahead of the waves in the track B.

When in-phase signals of amplitude $a_3$ and $a_{23}$ are propagated from the transducers 3 and 23 respectively, each of the signals $a_3$ and $a_{23}$ is split to form signals of equal amplitude in the two tracks A and B on the far side of the coupler 19. Let the phase of the contribution of the signal $a_3$ to the output signal in track A, at a plane P on the output side of the coupler 19, be taken as a reference. Relative to this signal, the phase of the contribution of signal $a_3$ to the output in track B will be advanced $\pi/2$ radians by the steps in the coupler 19, and advanced a further $\pi/2$ radians by the coupler action. The contribution from signal $a_{23}$ to track B will be in phase with the reference signal. The contribution from the signal $a_{23}$ to the output in track A will be set back, or delayed, $\pi/2$ radians by the steps in the coupler, but the $\pi/2$ radians advance caused by the coupler action will exactly compensate for this. Hence the output in track A is a summation of the signals $a_3$ and $a_{23}$, but in track B the signal contribution derived from the signal $a_3$ is inverted and the resultant output signal is the difference of the signals $a_3$ and $a_{23}$. Hence the device forms a hybrid junction circuit, in which the transducers 3 and 23 are the input ports, and the transducers 21 and 7 are the sum port and the difference port, respectively.

Figure 9:
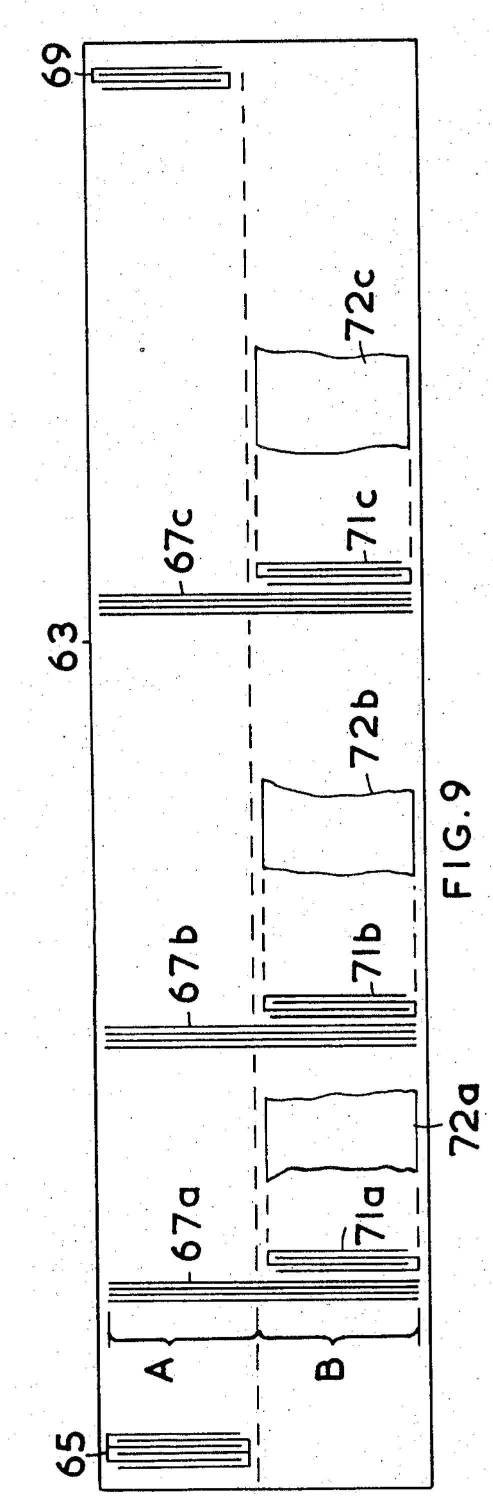
FIG. 9 and FIG. 10 are plan views of alternative acoustic surface wave tapped delay lines.

FIG. 9 is a plan view of an acoustic surface wave tapped delay line. An acoustic surface wave substrate 63 has a line of symmetry S between two acoustic surface wave tracks A, B both of width $b$ and one on either side of the line S. An interdigital comb transducer 65, of width $b$, is deposited on the substrate 63 in a position suitable for launching acoustic surface waves along the track A. A series of fractional acoustic surface wave couplers 67$a$, 67$b$, 67$c$, ... similar to the coupler 5 in FIG. 1, but having a smaller number of conductrs, is deposited on the substrate 63. An interdigital comb transducer 69 is deposited on the substrate 63 in the track A on the far side of the couplers 67$a$, 67$b$, 67$c$ ..., from the interdigital comb transducer 65. Other interdigital comb transducers 71$a$, 71$b$, 71$c$, ..., are deposited on the substrate 63 in the track B on the farther side from the interdigital comb transducer 65 of the couplers 67$a$, 67$b$, 67$c$, ..., respectively. A set of pads of suitable acoustic absorbing material 72$a$, 72$b$, 72$c$, ... are placed in the track B between the transducers 71$a$, 71$b$, 71$c$, ....

The action of the device is as follows. Acoustic surface waves launched in the track A by the transducer 65 are received by the transducer 69 after a delay corresponding to the time taken for acoustic surface waves to travel along the track A between the transducer 65 and the transducer 69, as in a conventional acoustic surface wave delay line. However, as the acoustic surface waves pass the couplers 67$a$, 67$b$, 67$c$, ..., each coupler transfers a fraction of the wave energy to the track B, which will be detected and converted to provide an electrical output from the adjacent one of the transducers 71$a$, 71$b$, 71$c$, ... . The absorbers help to reduce spurious signals. The remaining energy in the track A will provide a signal at the final transducer 69. The acoustic surface wave path lengths between the transducer 65 and the transducers 71$a$, 71$b$, 71$c$, ..., determine the relevant delay periods.

Figure 10:
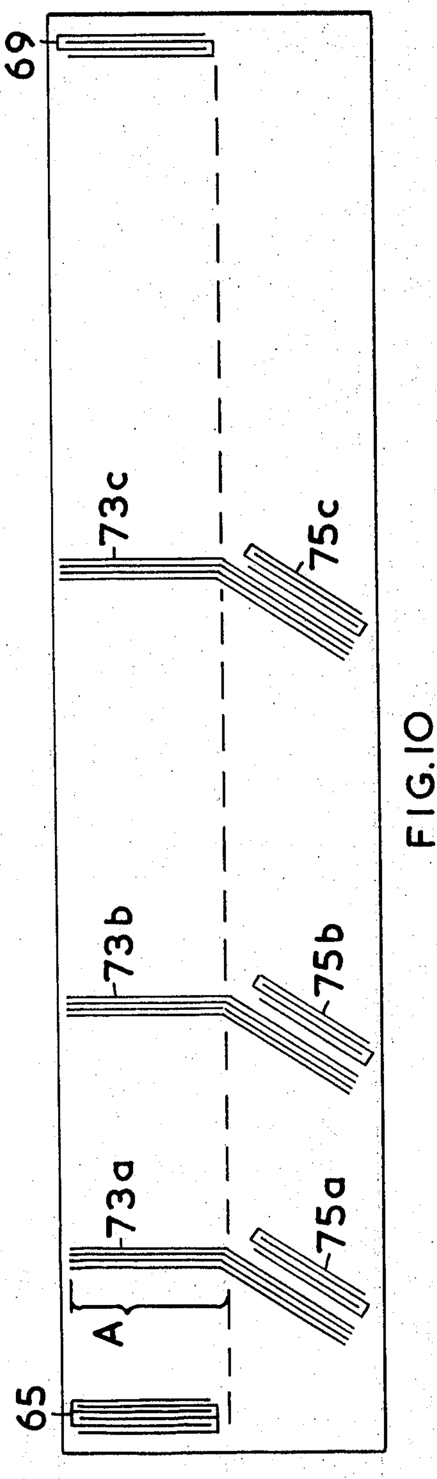

FIG. 10 is a plan view of an alternative acoustic surface wave tapped delay line. This tapped delay line resembles the delay line of FIG. 9, except that the fractional length couplers 67$a$, 67$b$, 67$c$, ..., having straight conductors are replaced by fractional length couplers 73$a$, 73$b$, 73$c$, ..., having angled conductors to direct their output waves at an angle to the track A. Output transducers 75$a$, 75$b$, 75$c$, ..., are deposited to receive the output waves from the couplers 73$a$, 73$b$, 73$c$,..., respectively. This arrangement is a way of reducing the amount of acoustic surface wave energy reflected by the transducers which can form spurious signals in previous transducers.

Couplers of the kind herein described may also be used as mode discriminators, since they are highly responsive to acoustic surface waves but comparatively insensitive to bulk surface waves. Thus if the transducer 3 in FIG. 1, for instance, is liable to generate unwanted bulk acoustic waves, the full length coupler 5 may be utilized simply to separate the acoustic surface waves, which will be transferred to the track B, while the bulk acoustic waves, being comparatively unaffected by the coupler 5, continue in the track A. Such couplers may also be used, in a similar way, to discriminate between different acoustic surface wave modes which may exist where the acoustic surface waves are propagated in a thin film of material on a substrate of different material.

Figure 11:
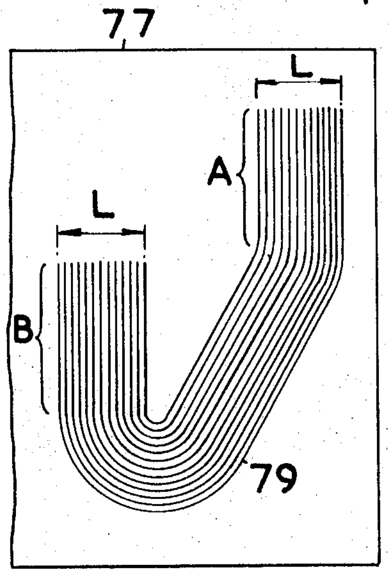
FIG. 11 and FIG. 12 are plan views of broad-band acoustic surface wave track changers.

FIG. 11 is a plan view of a broad-band acoustic surface wave track-changing coupler 79, deposited on an acoustic surface wave substrate 77. The track-changing coupler 79 consists of a plurality of J-shaped conductors, nesting inside each other in such a way that all the conductors are straight and parallel to one another at one end, defining a first acoustic surface wave track A, and all the conductors are straight and parallel to one another at the other end, defining a second acoustic surface wave track B. The length of the track-changer in both acoustic surface wave tracks is L. The two acoustic surface wave tracks are parallel to one another, but because of the nesting configuration, the order of the conductors in one of the tracks is reversed with resepct to their order in the other track. If the substrate 77 is made of anisotropic piezoelectric material, then it may be possible to arrange that the direction of the conductors in any other parts of the track-changing coupler 79 where the conductors happen to be parallel to one another is such that the direction perpendicular to those parts is a piezoelectrically inactive direction, so that no acoustic surface waves will be propagated in that direction.

The action of the track-changing coupler is as follows. Acoustic surface waves incident at the track-changing coupler 78 in the first acoustic surface wave track A cause electric fields to be set up between adjacent conductors. Thses fields are transferred from the first acoustic surface wave track A to the second acoustic surface wave track B. Since the order to the conductors in the two acoustic surface wave tracks is reversed, because of the configuration of the conductors constituting the track changer 79, the acoustic surface wave launched in the second acoustic surface wave track B will travel in the opposite direction to the original acoustic surface wave in the first track A; thus the coupler 79 can be used to transfer energy from the track A to the track B, or vice versa.

Figure 12:
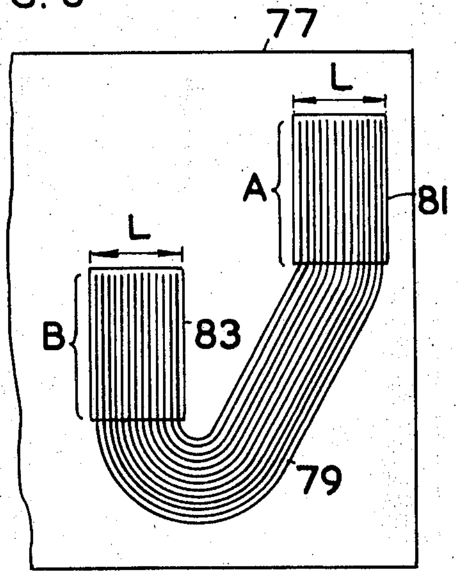

FIG. 12 is a plan view of an alternative broad band acoustic surface wave track changing coupler, which incorporates an alternative arrangement for preventing the launching of acoustic surface waves by parts of the track changer between its ends. The substrate 77 is made of glass or some other elastic, non-piezoelectric material, on which the J-shaped conductors constituting the coupler 79 are deposited. A thin film 81 of piezoelectric material such as zinc oxide is sputtered or otherwise deposited over the conductors at one end of the track changer 79 where they cross the track A, and a thin film 83 of zinc oxide is sputtered or otherwise deposited over the conductors at the other end of the coupler 79 where they cross the track B. It is only at the regions covered by the piezoelectric thin films 81 and 83 that there is any coupling between acoustic surface waves and electric fields, so that acoustic surface waves are launched and detected only in these regions and other parts of the conductors of the coupler 79 act simply as electrical conductors.

Figure 13:
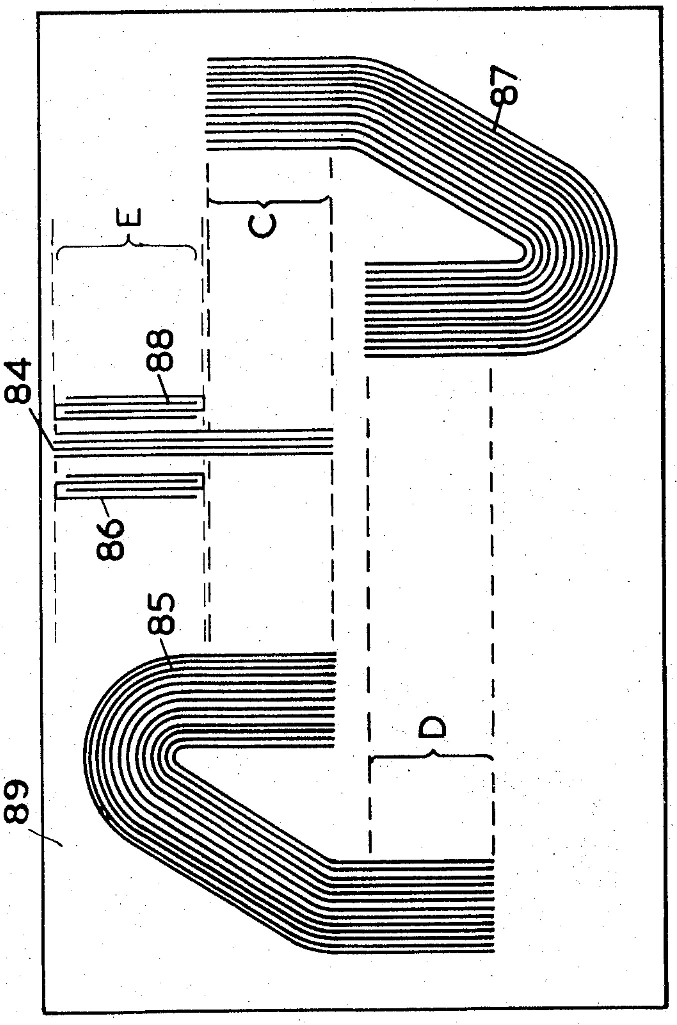
FIG. 13 is a plan view of an acoustic surface wave resonator or recirculating delay line incorporating two track changers.

FIG. 13 is a plan view of an acoustic surface wave resonator or recirculating delay line, incorporating two track-changing couplers hereinafter called track changers. The two track changers 85 and 87, of the form described above with reference to FIG. 11 or FIG. 12, are deposited on a substrate 89 in such a way that the two acoustic surface wave tracks C and D coupled by track changer 85 are the same as the two acoustic surface wave tracks coupled by the track changer 87. A fractional multistrip coupler 84 is placed to couple the track C to another track E, on which there are two transducers 86 and 88, placed on opposite sides of the coupler 84.

The action of the device is as follows. The energy of acoustic surface waves launched by the transducer 86 is partially transferred to the track C by the coupler 84. The acoustic surface waves thus propagated in the track C are coupled into the track D by the track changer 87, and coupled into track C again by the track changer 85. The device constitutes a resonator having a period equal to the combined delay of the path C and the path D; signals injected into the loop comprising the tracks C and D and track changers 85 and 87 may go round the loop several times or many times. Each time the signals pass the coupler 84 a fraction of their energy is transferred to the transducer 88 by the coupler 84. It should be noted that it is the short length of the coupler 84 which makes the device a resonator. If it were replaced by a full length multistrip coupler, then the resonator would become a delay line in which all the energy of the waves launched by the transducer 86 would be injected into the track C by the coupler and would be wholly extracted by the coupler after one single circuit of the delay line.

Figure 14:
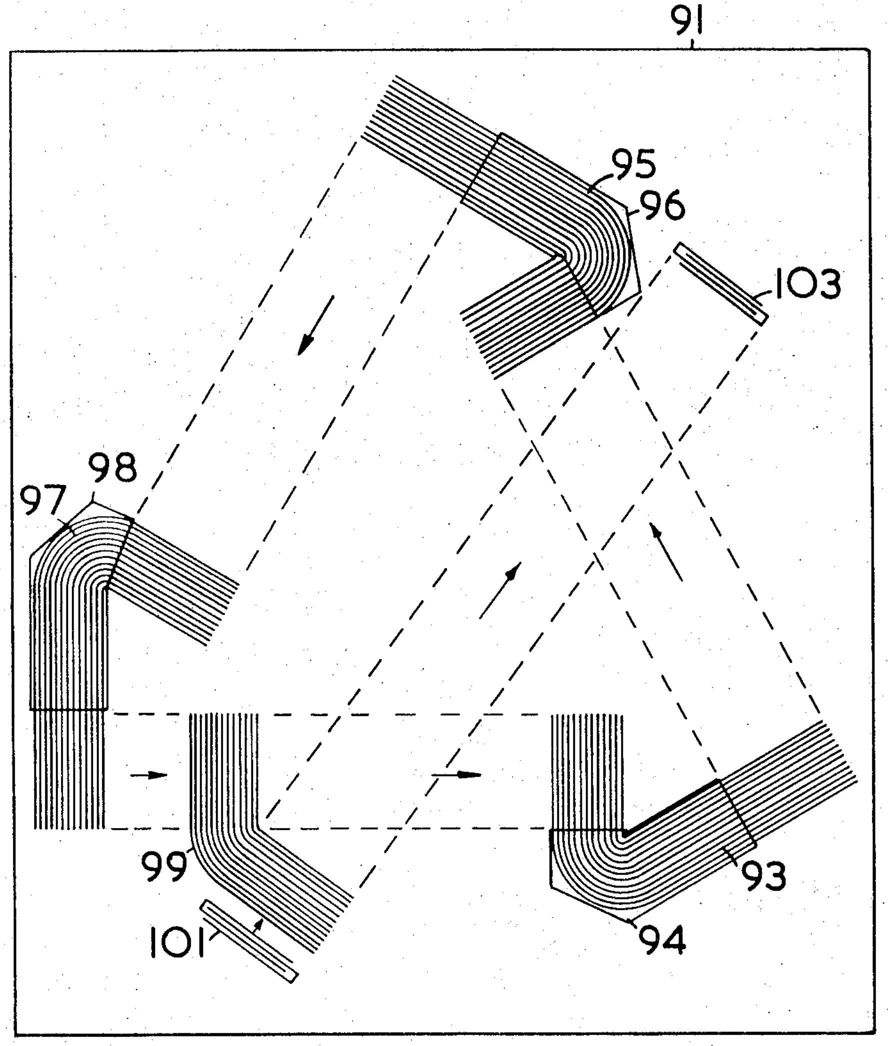
FIG. 14 is a plan view of an acoustic surface wave delay line incorporating angled couplers.

FIG. 14 is a plan view of an acoustic surface wave delay line incorporating angled couplers. An acoustic surface wave substrate 91 has deposited on it three full-length angled couplers 93, 95 and 97 disposed at the corners of an equilateral triangle, and arranged so that each angled coupler will receive acoustic surface waves from one of the other angled couplers and will retransmit them in the direction of the third angled coupler. The connecting parts of the angled couplers 93, 95 and 97 are deposited over silica pads 94, 96 and 98 respectively to minimize the coupling between the substrate 91 and those parts of the couplers 93, 95 and 97 which are not required to receive or launch acoustic surface waves. By itself this arrangement of couplers would constitute a triangular acoustic surface wave resonator, but a fourth angled coupler 99 is provided for launching acoustic surface waves into the delay line and extracting acoustic surface waves from the delay line. The angled coupler 99 is fed by a first interdigital comb transducer 101 and feeds a second interdigital comb transducer 103.

The action of the device is as follows. Acoustic surface waves launched by the interdigital comb transducer 101 are recieved by th angled coupler 99 and hence launched in the triangular circuit. The acoustic surface waves are received by the angled coupler 93, and thence propagated to the angled couplers 95 and 97 in turn. Acoustic surface waves launched by the angled coupler 97 are received again by the angled coupler 99 and launched in the direction of the interdigital comb transducer 103. By this means a delay line having a delay equivalent to the total path length between the transducers 101 and 103 via the angled couplers 99, 93, 95, 97, and 99 again respectively, is constituted. It is to be remarked that the coupler 99, having a strong coupling because it is a full length multistrip coupler, acts to make the device a delay line. If it were replaced by a fractional length multistrip coupler then the delay line would become a resonator in which each signal injected could travel several times round the circuit.

Figure 15:
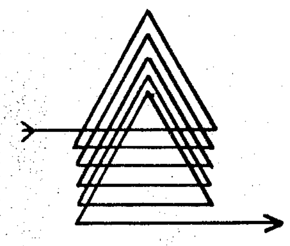
FIG. 15 is a plan view of a folded acoustic surface wave delay line.

By the use of such angled couplers, even longer folded delay lines can be arranged on reasonably small slices of material. FIG. 15 is a plan view of such a folded acoustic surface wave delay line. In this figure the angled couplers are not illustrated and only the folded acoustic surface wave path is shown, on a much smaller scale than the other diagrams. The path consists of a series of triangles each overlapping the adjacent one by a small amount, in order to achieve a long path length on a comparatively small substrate.

Figure 16:
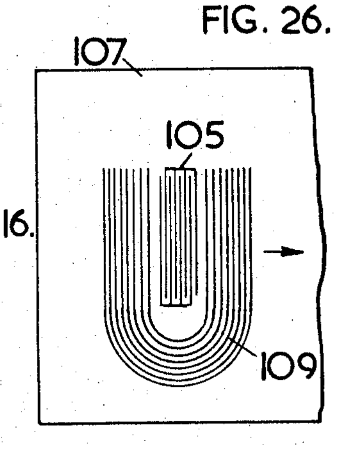
FIG. 16 and FIG. 17 are plan views of alternative broad-band acoustic surface wave unidirectional transducers.

FIG. 16 is a plan view of a broad-band acoustic surface wave unidirectional transducer. An interdigital comb transducer 105 and an acoustic surface wave coupler 109 are deposited on a piezoelectric substrate 107. The coupler 109 consists of a plurality of U-shaped filamentary conductors, having long parallel portions at their extremities, all nesting together so that the coupler 109 itself is U-shaped. The interdigital comb transducer 105 is deposited between the arms of the U-shaped coupler 109 so that the long parallel portions of the conductors constituting the coupler 109 are equal in length and parallel to the fingers of the interdigital comb transducer 105. The coupler 109 is so placed relative to the center line of the interdigital comb transducer 105 that acoustic surface waves propagated by the transducer 105 and travelling in opposite directions will arrive at the innermost edges of the innermost wire of the coupler 109 in a quadrature with each other. This can be arranged by placing the interdigital comb transducer 105 so that one of its fingers is centered on a line one-eighth of an acoustic surface wave length to one side of the axis of symmetry of the coupler 109. The width of each side of the coupler 109 is the half-transfer length $L_{1/2}$, that is to say the coupler 109 is a folded half-length multistrip coupler.

The action of the device is as follows. The acoustic surface waves propagated by the transducer 105 in both directions reach the innermost wire of the coupler 109 with a quadrature phase relationship, so that the coupler 109 acts like the transducer 35 in FIG. 6. Hence acoustic surface waves will be propagated from one straight portion only of the coupler 109. Hence the transducer will be unidirectional, propagating signals only from the side of the U which receives the leading signal.

Figure 17:
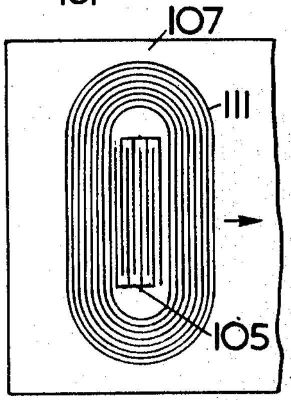

FIG. 17 is a plan view of an alternative broad-band acoustic surface wave unidirectional transducer. As in the transducer described above with reference to FIG. 16, an interdigital comb transducer 105 and an acoustic surface wave coupler 111 are deposited on an acoustic surface wave substrate 107. The coupler 111 consists of a plurality of elongated O-shaped conductors having long parallel portions on each side, all nesting inside each other, so that the coupler 111 itself is O-shaped. The transducer 105 is placed within the coupler 111 as the transducer 105 in FIG. 16 was placed between the arms of the coupler 109.

This device acts similarly to the device of FIG. 16, but each straight portion of a conductor of the coupler 111 is joined to a corresponding straight portion on the opposite side of the coupler 111 by two conductors instead of one. This provides current paths of lower resistance, and reduces the deleterious effect of any single unwanted break in any conductor. The disadvantage is that a greater length of conductor is required, and this puts a greater capacitive load on the coupler 111.

Unidirectional transducers of the kind shown in FIG. 16 or FIG. 17 can advantageously be substituted for the simple interdigitated comb transducers shown in many of the devices herein described, for instance in place of the transducers 3, 23, 21 and 7 of the hybrid junction circuit of FIG. 8.

Figure 18:
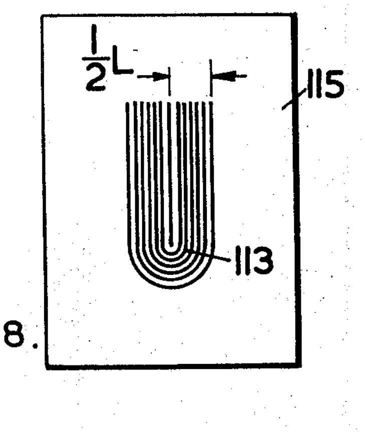
FIG. 18 is a plan view of an acoustic surface wave reflector.

FIG. 18 is a plan view of an acoustic surface wave reflector 113, deposited on an acoustic surface wave substrate 115. The reflector is a folded *3dB* coupler, generally similar to the coupler 109 of FIG. 16 except that it has no gap between the two arms of the U.

The action of the reflector is as follows. It can be regarded as a half-length coupler (like the coupler 19 of FIG. 4) bent back on itself. Acoustic surface waves incident on the half-length coupler 19 in the path A produce two acoustic surface wave outputs of equal amplitude, in a quadrature phase relationship. In the coupler 113, these two waves will each be fed into the opposite arm of the U. The coupler is therefore effectively in a similar situation to the coupler of FIG. 5; its two halves are receiving equal signals in quadrature with each other. Hence it propagates an output wave from one half only, and in the folded form of FIG. 18 it returns the output wave in the opposite direction to the incident wave. Thus it acts as an efficient reflector of acoustic surface waves.

Figure 19:
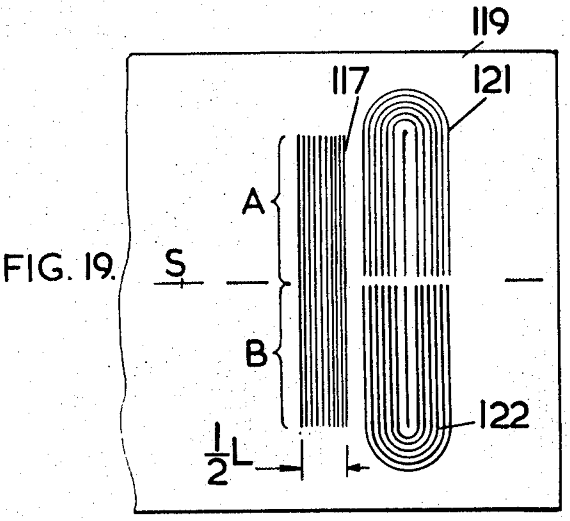
FIG. 19 is a plan view of an alternative acoustic surface wave track changer.

FIG. 19 is a plan view of an alternative acoustic surface wave track changer. An acoustic surface wave substrate 119 has a line of symmetry S between two adjacent acoustic surface wave tracks A and B both of width *b*. A half-length multistrip coupler 117 is deposited across both tracks A and B, and two acoustic surface wave reflectors 121 and 122, of the kind shown in FIG. 18, are deposited in the tracks A and B respectively, both on the same side of the coupler 117.

The action of the track changer of FIG. 19 is a combination of the effects described with refernece to FIG. 4, FIG. 5 and FIG. 18. When an acoustic surface wave signal reaches the coupler 117 in track A, the coupler 117, acting like the coupler 19 of FIG. 4, effectively splits the incident energy between two waves propagated from the output side of the two halves of the coupler 117. The two reflectors 121 and 122 return these two waves to the two halves of the coupler 117. The coupler 117 is now in a situation like the coupler 19 of FIG. 5, receiving signals in quadrature, and therefore passes an output signal in the track which receives the leading signal. Thus the signal received by the track changer in track A is effectively returned in track B, and it can equally well act in the converse sense, taking any acoustic surface wave signal from track B and reflecting it in track A. In effect, it forms a track-changing reflector.

Figure 20:
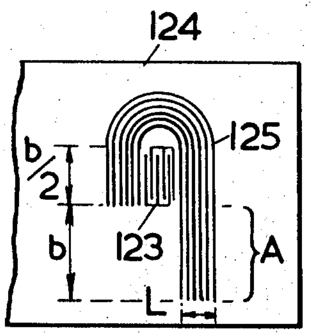
FIG. 20 is a plan view of a unidirectional acoustic surface wave transducer.

FIG. 20 is a plan view of another form of unidirectional acoustic surface wave transducer. An interdigital comb transducer 123 of width 1/2*b*, formed on an acoustic surface wave substrate 124, is coupled to an acoustic surface wave track A by a full length coupler 125. The coupler 125 consists of a plurality of J-shaped conductors each having two straight mutually parallel arms of unequal length. These conductors are nested inside each other so that the coupler 125 is itself J-shaped. The shorter arm of the J runs parallel to the fingers of the transducer 123 but does not extend into the track A. The track A has width *b* and does not overlap the transducer 123. The longer arm of the J runs across the whole of the track A at right angles. The transducer 123 is positioned so that acoustic surface waves launched by the transducer 123 in both directions will arrive at the innermost wire of the coupler 125 in phase with each other.

The coupler 125 is substantially equivalent to the basic coupler 5 of FIG. 1, with its top half folded back on itself. Though the arrangement looks different, as far as the action of the coupler is concerned it is being stimulated in the same way as the coupler of FIG. 1, and being a full-length coupler it transfers substantially all the input energy to the other side of its other half. Therefore it propagates the signals from its outer conductor, in track A only.

The coupler of FIG. 20 can equally well be used for receiving acoustic surface waves incident in the track A on the outermost conductor of the coupler 125. The transducer 123 will not receive acoustic surface waves incident on the innermost wire of the coupler 125. The unidirectional sensitivity of this arrangement makes it useful in many devices.

If the transducer 123 is omitted, then the coupler 125 will act as a reflector to acoustic surface waves incident on the outermost wire of the coupler 125 as the leading edge, but it will tend to split surface waves incident on the innermost wire of the coupler 125 at the leading edge into two waves propagating in opposite directions from the folded part of the coupler.

Preferably the arcuate portions of the coupler 125, which do not intersect with the track A or with the track of acoustic surface waves launched or received by the transducer 123, are connecting-portions as defined above.

Figure 21:
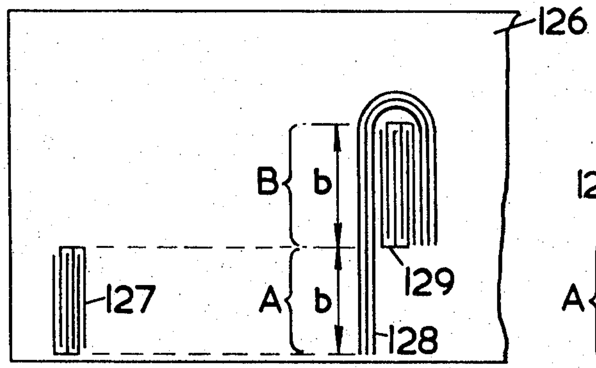
FIG. 21 is a plan view of an acoustic surface wave tapped delay line.

FIG. 21 is a plan view of an acoustic surface wave tapped delay line. An acoustic surface wave substrate 126 carries an interdigital comb transducer 127 placed to launch acoustic surface waves on a track A of width *b*. The substrate 126 also carries a plurality of delay line taps comprising a plurality of couplers, of which one coupler 128 is illustrated. The coupler 128 is a modified form of the coupler 125 described above with reference to FIG. 20 with two significant differences, particularly appropriate for this application. Firstly, the coupler 128 is positioned to transfer some energy into an interdigital comb transducer 129 of width *b* (rather than 1/2*b*) which is positioned in an acoustic surface wave track B parallel and adjacent to the track A. Secondly, the coupler 128 is a fractional coupler. Preferably the portions of the coupler which do not intersect with either of the tracks A or B, are connecting-portions as defined above.

Figure 22:
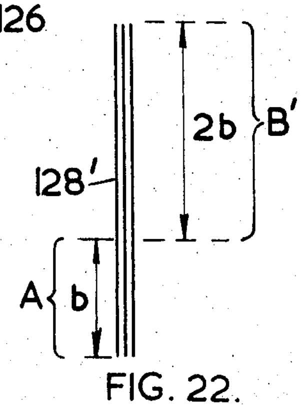
FIG. 22 is a diagram intended to assist in explaining the operation of the acoustic surface wave tapped delay line described with reference to FIG. 21.

In the delay line of FIG. 21, acoustic surface waves launched in the track A by the transducer 127 are received after different delays by various delay line taps such as the delay line tap comprising the coupler 128. Each tap is only required to extract a small amount of energy in order to leave sufficient energy for extraction by subsequent taps. The coupler 128 can be regarded as a folded coupler which if unfolded would be equivalent to a coupler 128' for coupling waves from a narrow track A into a track B', twice the width of track A. This is illustrated in FIG. 22. Such a coupler could not be designed to obtain complete transfer of energy, but it should be remembered that delay line taps are not required to obtain complete transfer of energy. It is quite possible and useful to extract a signal say 20 *dB* lower than that launched by the transducer 127. Signals from the whole of the wide track B' (FIG. 22) are launched in phase with each other towards the transducer 129, so that the transducer 129 will receive a signal 3*dB* higher than it would have received from a simple coupler of similar length as shown in FIG. 8. The arrangement is also advantageous because it allows the required amount of energy to be extracted by a coupler having fewer conductors than a comparable simple coupler.

It is possible to extract more power from transducers such as the transducer 129 by tuning them in a known manner with a series inductor to provide a series resonant circuit, the transducer itself providing the capacity. This extra power extracted is at the expense of power normally not absorbed by the transducer, and not at the expense of power propagated down the delay line.

The delay line taps may be so shaped as to allow the transducers to be angled away from the wavefronts of acoustic surface waves travelling down e delay line, like the angled delay line taps hereinbefore described with reference to FIG. 10.

An important property of delay line taps such as the combination of the coupler 128 and the transducer 129 is that they are unidirectional and will only respond to acoustic surface waves travelling in one direction. This makes delay line taps of this form particularly useful in folded delay lines and similar devices where a signal or an unwanted reflection may return past a tap, for instance if it is required to add taps to the delay line hereinafter described with respect to FIG. 24.

Figures 23, 24:
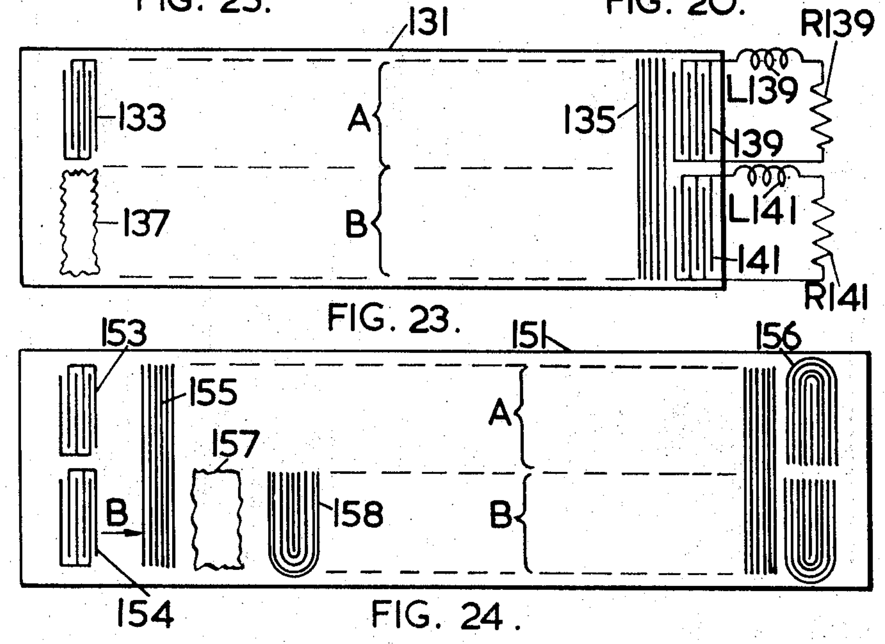
FIG. 23 is a plan view of an acoustic surface wave delay line incorporating means for suppressing triple transit signals.
FIG. 24 is a plan view of a reflecting acoustic surface wave delay line.

FIG. 23 is a plan view of an acoustic surface wave delay line incorporating means for suppressing triple transit signals. In a delay line which consists of a signal launcher, a delay medium and a signal receiver, most of the signal launched into the delay medium by the signal launcher will be absorbed by the signal receiver. However experience shows that a fraction of the signal incident on the signal receiver may be reflected and some of this reflected signal may reach the signal launcher. A fraction of the signal incident at the signal launcher may again be reflected and of this signal some may be received once more at the signal receiver. Since this signal will have traversed the delay medium three times it is known as a triple transit signal, and although its power level will be low compared with the original received signal, it may be high enough to form troublesome unwanted echo signals.

In FIG. 23 an acoustic surface wave substrate 131 carries two parallel adjacent tracks A and B. An interdigital comb transducer 133 is arranged to launch acoustic surface waves in the track A. A 3 *dB* coupler 135 is positioned across both the tracks A and B in the path of acoustic surface waves launched by the transducer 133. An acoustic surface wave absorber 137 is positioned in the track B on the same side of the coupler 135 as the transducer 133. An interdigital comb transducer 139 is positioned at the end of the track A remote from the transducer 133. An interdigital comb transducer 141 identical in all respects to the transducer 139 is positioned in the track B at exactly the same distance from the coupler 135 as the transducer 139. The transducer 139 is electrically connected in series with an inductor L139 and a load resistor R139, and the transducer 141 is electrically connected in series with an inductor L141 which is identical to the inductor L139 and a dummy load resistor R141 which is identical to the load resistor R139.

Th action of the device is as follows. Acoustic surface wave signals are launched in the track A by the transducer 133. These signals are split equally between the track A and the track B, by the action of the 3 *dB* coupler 135, and the output signal is taken from the load resistor R139. The 3 *dB* coupler 135 thus applies signals of equal amplitude but having a relative phase difference of $\pi/2$ radians, which will be incident at the transducers 139 and 141, and as the transducers 139 and 141 are electrically identical to one another, any signal reflected by the transducer 139 in the track A will have an exact counterpart in a signal reflected by the transducer 141 in the track B. The signal in the track B will retain its $1/2\pi$ phase advance over the signal in the track A and so the action of the 3 *dB* coupler 135 on these two reflected signals will be to combine them and propagate them back along the track B, where they will be absorbed by the absorber 137.

The transducers 139 and 141 may advantageously be unidirectional transducers, as hereinbefore described with reference to FIG. 16 or FIG. 17 or FIG. 21. However, in any case, provided the transducers 139 and 141 are mechanically and electrically identical, all unwanted reflections will be propagated towards the absorber 137.

FIG. 24 is a plan view of a reflecting acoustic surface wave delay line, which can be used to double the delay time available with a given length of acoustic surface wave substrate.

An acoustic surface wave substrate 151 carries two parallel adjacent tracks A and B. An intedigital comb transducer 153 is arranged to launch acoustic surface waves in the track A. An interdigital comb transducer 154 is positioned in the track B adjacent to the comb transducer 153. The function of the transducer 154 is to extract the delayed acoustic surface wave. A 3*dB* coupler 155 is positioned across the track A and B close to the transducer 153 and the transducer 154. A track changer 156 of the type hereinbefore described with reference to FIG. 19 is positioned across the track A and the track B at the end of the substrate 151 remote from the transducers 153 and 154. An acoustic surface wave absorber 157 is positioned in the track B adjacent to the coupler 155 and on the side remote from the transducer 154. A reflector 158 of the type hereinbefore described with reference to FIG. 18 is positioned in the track B adjacent to the absorber 157 and on the side remote from the transducer 154.

The action of the device is as follows. Signals are launched in the track A by the action of the transducer 153. By the action of the 3*dB* coupler 155 the signal energy is split to give rise to equal signals in the track A and the track B. Energy so launched in the track B is absorbed by the action of the absorber 157. The signals in the track A are coupled into the track B by the action of the track changer 156, reflected by the action of the reflector 158, coupled back into the track A by the action of the track changer 156 and propagated once more towards the coupler 155. By the action of the coupler 155 the signal energy returning in track A is again divided between track A and track B, so that signal energy is received by the transducer 154. Since the signal energy is halved twice, there is a 6*dB* loss inherent in this device. An alternative is to use a pair of unidirectional transducers and omit the coupler 155. Unidirectional or bidirectional taps (not shown) can be placed in the track A if desired.

Figure 25:
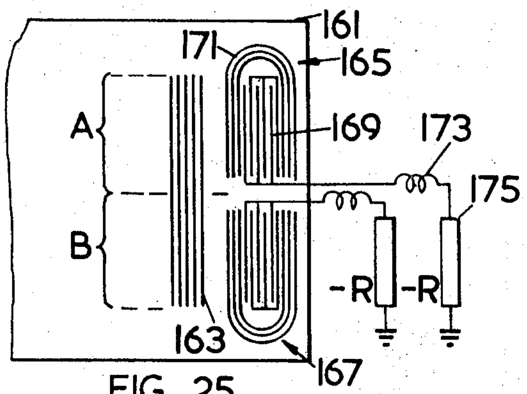
FIG. 25 is a plan view of an amplifying track changer.

FIG. 25 is a plan view of an amplifying track changer, which may be regarded as an improvement on the track changer hereinbefore described with reference to FIG. 19.

An acoustic surface wave substrate 161 carries two parallel adjacent tracks A and B. A 3*dB* coupler 163 is positioned on the substrate 161 across both the track A and the track B, and each track A and B has positioned on it a reflector comprising a unidirectional transducer of the kind hereinbefore described with reference to FIG. 16. The reflector 165 on track A comprises a U-shaped acoustic surface wave coupler 171, partially surrounding an interdigital comb transducer 169 which is electrically connected in series with a tuning inductor 173 and a negative resistance device 175. The negative-resistance device may be a conventional device having a negative-resistance operating characteristic, for instance a tunnel diode circuit. The reflector 167 in track B is similarly constructed and connected. The reflectors 165 and 167 are equidistant from the coupler 163. The negative resistance devices and tuning inductors are identical.

The action of the amplifying track changer clearly follows similarly to the action of the simple track changer hereinbefore described with respect to FIG. 19, except that the transducers and the negative-resistance devices connected to them amplify the reflected signals.

Figure 26:
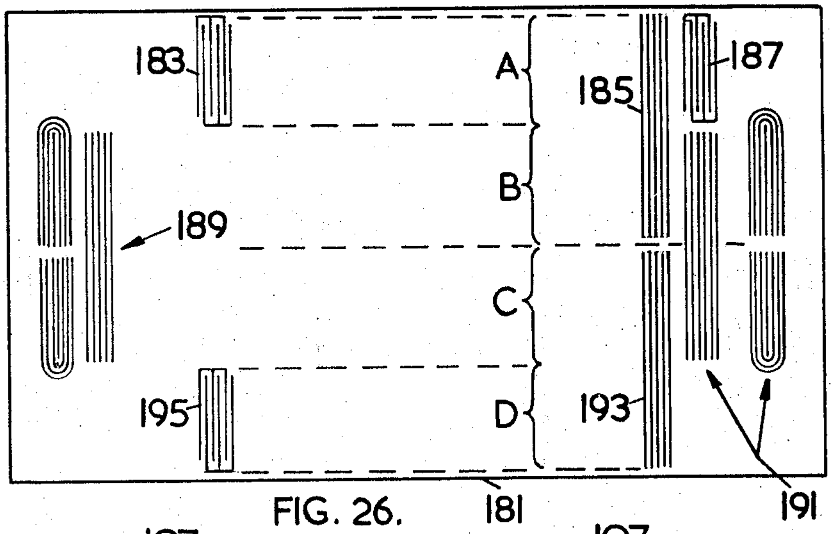
FIG. 26 is a plan view of a directional filter.

FIG. 26 is a plan view of a directional filter. Directional filters are known in the microwave art and are a form of resonator. A known form of microwave directional filter is constructed as follows. A microwave source is connected to a first matched load via a first directional coupler. The first directional coupler is connected to a second directional coupler via a circulating cavity. The second directional coupler couples into a waveguide which feeds a second matched load. Assuming that the source has a broad band output, the frequency spectrum of the output of the first matched load has a series of notches spaced apart by frequency differences dependent on the phase shift in the circulating cavity, because these frequencies are the most strongly accepted by the circulating cavity. They appear as spikes in the frequency spectrum of the output of the second matched load. The width of the notches and the spikes is determined by losses in the circulating cavity and in the two directional couplers. FIG. 26 shows a plan view of an analogous acoustic-surface-wave device.

In FIG. 26 a substrate 181 carries four parallel adjacent tracks A, B, C, D in that order. An interdigital comb transducer 183 is positioned to launch acoustic surface waves in the track A. A coupler 185 is placed across the tracks A and B, so that some of the energy launched by the transducer 183 is propagated along the track B. The remainder of the energy propagated along the track A is incident on an interdigital comb transducer 187. The tracks B and C have reflecting track changers 189, 191 at either end, whereby energy in the track B is transferred by the track changer 191 to the track C, and energy in the track C is transferred by the track changer 189 to the track B. A further coupler 193 is placed across the tracks C and D adjacent to the coupler 185, whereby some of the energy in the track C is launched into the track D. An interdigital comb transducer 195 is positioned to receive energy so launched into the track D.

The action of the device is as follows. The tracks B and C together with the reflecting track changers 189 and 191 constitute a resonator wherein the acoustic surface waves can circulate, and energy is coupled into and out of this resonator by means of the couplers 185 and 193 respectively. The resonator will have a series of resonant frequencies determined by the phase delay in a complete circuit of tracks B an C; these resonant frequencies will build up in the resonator much more than any other frequencies introduced to it, and so the output of the coupler 193, extracted by the transducer 195, will have a frequency spectrum which has a series of spikes at the resonant frequencies. The output of the transducer 187 will be the remainder of the output of the transducer 183, and hence its frequency spectrum will have a series of notches at the resonant frequencies.

The degree of coupling into and out of the circulating cavity is adjusted at the design stage by adjusting the lengths of the couplers 185 and 193 to satisfy the coupling condition desired.

Figure 27:
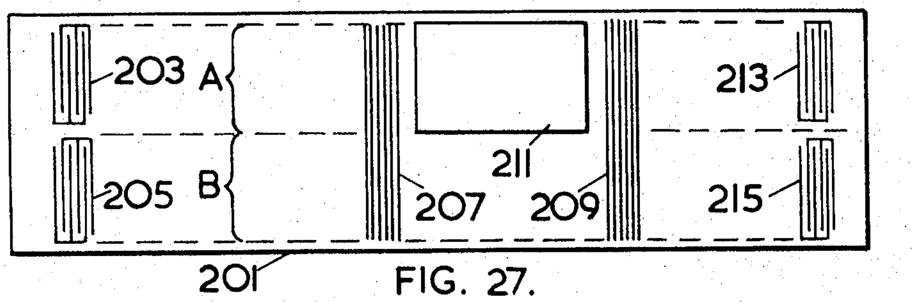
FIG. 27 is a plan view of a variable directional coupler.

FIG. 27 is a plan view of a variable directional coupler device. An acoustic surface wave substrate 201 carries two parallel adjacent tracks A and B. Two transducers 203 and 205 are placed adjacent to each other at one end of the substrate 201, with the transducer 203 on track A and transducer 205 on track B. Two more transducers 213 and 215 are placed at the opposite end of the substrate, the transducer 213 in track A and the transducer 215 in track B. Two multistrip couplers 207 and 209 are placed across both tracks A and B, and a region 211 of controllable acoustic velocity is formed over a part of track A between the couplers 207 and 209. The region 211 may for instance be a region incorporating material having electrically or magnetically controllable piezoelectric or electrostrictive characteristics, in which the velocity of acoustic surface waves can be adjusted by varying a biassing electrical or magnetic field, or other convenient external control.

The action of the variable coupler device is as follows. The region 211 can apply a controllable phase delay to acoustic surface wave signals in the track A relative to signals in the track B between the coupler 207 and the coupler 209. If both the couplers 207 and 209 are $3dB$ couplers, and the region 211 is inactive then all the power launched into the track A by the transducer 203 will be fed to the transducer 215 and all power launched in the track B by the transducer 205 will be fed to the transducer 213. By introducing a phase shift of $\pi$ radians in the track A by a control of the region 211, all the power launched into the track B by the transducer 205 will be fed to the transducer 215 in track B. Phase shifts of less than $\pi$ in the region 211 will produce an intermediate directional coupler action.

Figures 28, 29, 30, 31:
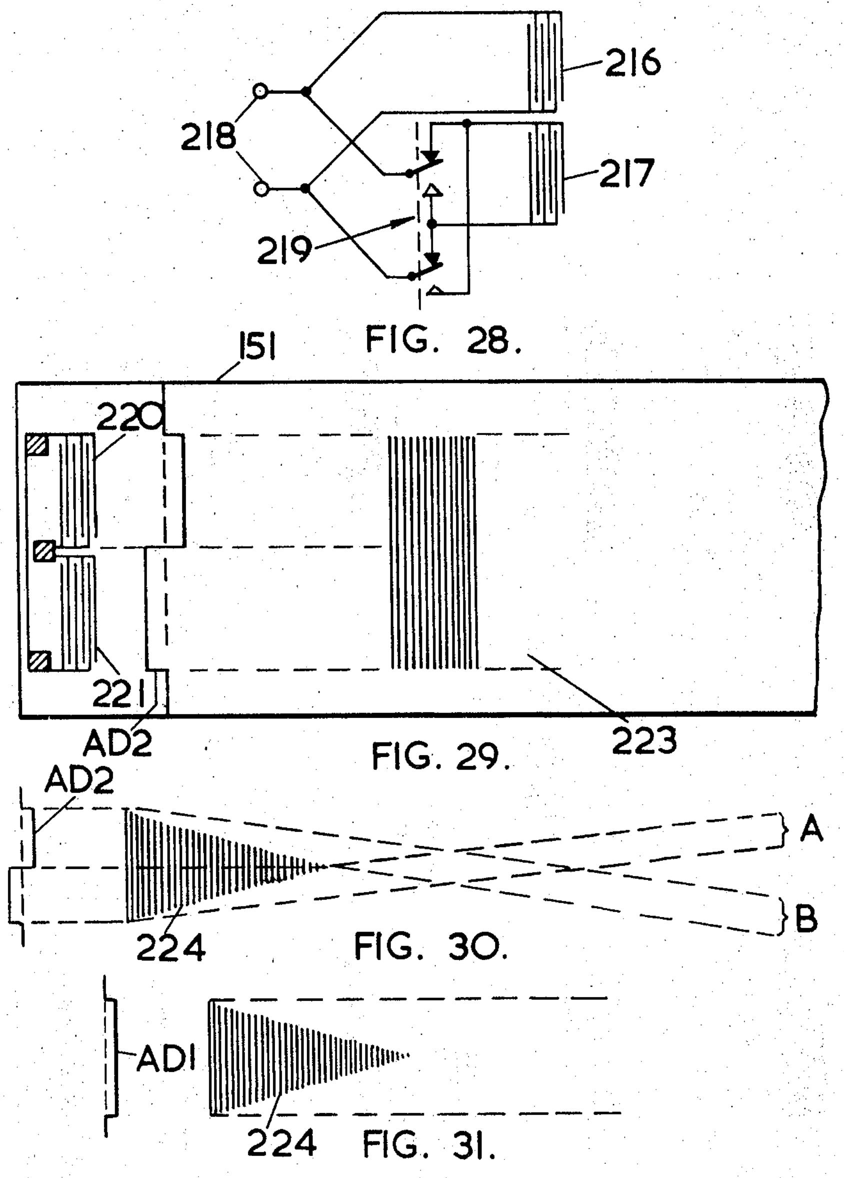
FIG. 28 is a circuit diagram of a transducer arrangement for launching symmetric mode or antisymmetric mode acoustic surface waves.
FIG. 29 is a diagram illustrating an alternative transducer arrangement for launching antisymmetric mode acoustic surface waves.
FIG. 30 is a diagrammatic plan view of an antisymmetric mode beam splitter fed with an antisymmetric mode signal.
FIG. 31 is a diagrammatic plan view of the antisymmetric mode beam splitter of FIG. 30 fed with a symmetric mode signal.

Antisymmetric modes and symmetric modes have been mentioned with reference to FIG. 1. Since the next few devices to be described concern these modes and the action of modes under an array of filamentary conductors, it is appropriate to return to this aspect of the operation of such devices. FIG. 28 is a circuit diagram of a transducer arrangement for producing acoustic surface waves either in a purely symmetric mode or in a purely antisymmetric mode. This comprises two identical interdigital comb transducers 216, 217 placed end to end so as to propagate acoustic surface waves along adjacent parallel tracks. The transducer 216 is connected directly across electrical signal connection terminals 218. The transducer 217 is connected to the terminals 218 through a reversihg switch 219. Although the switch 219 is represented conventionally, in practice it is preferably an electronic switch and may be formed as an integrated circuit.

With the switch 219 in the position shown, a signal applied to the terminals 218 will excite both transducers identically, launching a symmetric mode signal. With the switch in the opposite position the transducer 217 is excited in antiphase to the transducer 216, launching an antisymmetric wave along the pair of adjacent parallel tracks.

FIG. 29 shows an alternative arrangement for launching antisymmetric mode acoustic surface waves, by a pair of identical comb transducers 220, 221 deposited end to end on a substrate 222 so as to launch acoustic surface waves along adjacent parallel tracks. In this arrangement the connections of the interdigitated combs ensure that a signal applied to the pair of transducers will excite acoustic surface waves in antiphase relationship with each other, in other words forming an antisymmetric mode signal. The line AD2 forms a graphical representation of the amplitude of the asymmetric mode signal across the pair of adjacent parallel tracks. FIG. 29 also shows an array of spaced filamentary conductors 223 deposited over the path of the antisymmetric mode signals, aligned orthogonally to the direction of propagation.

It is possible to choose the material of the filamentary conductors and their dimensions so that symmetric mode signals will travel under the array at the same velocity as they travel along a clear part of the surface of the substrate 222. This is achieved by arranging that the short-circuiting effects of the width of each filamentary conductor on the piezoelectric fields in the direction of propagation is compensated for by mass loading effects. However, the antisymmetric mode signals will always travel more slowly since they cause currents to flow along the filamentary conductors, across the width of the track, and the conductivity of the conductors in this direction significantly reduces the effective piezoelectric stiffness of the material, slowing the antisymmetric mode signals.

FIGS. 30 and 31 are diagrams of an antisymmetric mode signal beam-splitter device comprising a plurality of parallel filamentary conductors 224, designed to have the velocity-matching adjustment mentioned hereinabove. The leading conductor is the longest and each successive wire is slightly shorter at both ends so that the profile of the beam splitter is an isosceles triangle placed symmetrically on the acoustic surface wave track. When this structure is fed with an antisymmetric mode signal, parts of the acoustic surface waves travelling in material under the structure travel more slowly than parts of the acoustic surface waves travelling in material not under the structure. Hence the effect of the structure is to refract the acoustic surface waves in two beams away from the original direction of propagation of the acoustic surface waves; this is illustrated in FIG. 30. On the other hand, when symmetric waves are fed to the structure, no velocity change takes place, and hence the acoustic surface waves do not change direction. This is illustrated in FIG. 31. The line AD2 in FIG. 30 is a graphical representation of the amplitude of the applied antisymmetric waves. The line AD1 in FIG. 31 is a corresponding graphical representation of the amplitude of the applied symmetric mode waves. In this beam-splitter device, the path of the acoustic surface waves is not wholly determined by the layout of the acoustic surface wave components on the surface of the substrate, but is also controlled electronically by the feed to the transducer or pair of transducers from which the acoustic surface waves are launched.

Figure 32:
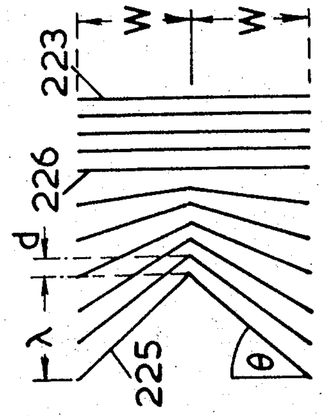
FIG. 32 and FIG. 33 are plan views of coupler matching portions intended to reduce spurious reflection.
Figure 33:
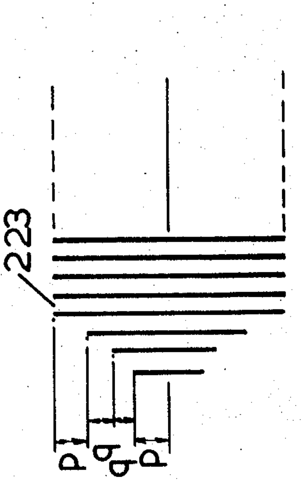

Unfortunately any structure which introduces a velocity discontinuity is likely to cause reflections of acoustic surface waves, which may cause spurious signals. Spurious signals may for example, occur due to reflections from the ends of couplers or similar acoustic waveguide structures. FIG. 32 and FIG. 33 are plan views of coupler matching portions intended to reduce spurious reflections.

In FIG. 32 the leading conductor 225 of a coupler or waveguide array 223 is V-shaped and is symmetrical about the line of symmetry between the two coupled acoustic surface wave tracks. The angle $\theta$ which the arms of the V make with a line perpendicular to the direction of propagation of acoustic surface waves is given by the formula $\tan \theta = \lambda/w$ where $\lambda$ is the wavelength in the substrate of acoustic surface waves and $w$ is half the width of the coupler. Subsequent conductors are also V shaped but with angles successively decreasing to zero. The distance $d$ between the apices of the V's may be the same as the mean distance between the conductors in the main part of coupler.

The action of the coupler is as follows. The first conductor 225 will not couple significantly to the wave. Subsequent V shaped conductors couple progressively more strongly as the angle $\theta$ becomes smallr until when $\theta = 0$ the conductors become straight. The coupling strength of the conductors near the leading edge of the coupler is thus smoothly tapered to zero. If a sufficient number of intermediate V-shaped conductors is used, between the first conductor 225 and the first straight conductor 226, then an acceptably small spurious echo signal should result. A similar pattern may be used at the trailing edge of the coupler.

In FIG. 33 the conductors near the leading edge of the coupler are progressively shortened while still remaining symmetric about the line of symmetry between the two coupled acoustic surface wave tracks. Consider one of these shortened conductors. It will be shorter in length than one of its neighbours by a small step at each end. Each step gives a reflection equal to a fraction of the reflection to be expected from a comparable unstepped simple coupler. The reflected acoustic surface wave is the vectorial resultant of the small reflections. It is possible to design the steps so that at a desired frequency (or frequencies) below the stop band frequency, the resultant of the reflections is minimized.

In general the steps will be arranged symmetrically, half the length of the shortest conductor being the same length as the step between each end of the longest conductor and its neighbour, and so on. Thus for a three step transition, (not shown) on each side of the coupler the lengths of the steps will be given by $x$, $y$, and $x$ respectively where $$2x + y = 1/2w,$$

where $w$ is the width of the coupler. For a four step transition (as shown in FIG. 33) the lengths of the steps in each of the two tracks will be given by $p$, $q$, $q$, and $p$ respectively, where $$2p + 2q = 1/2w.$$

A third method of reducing the reflection from a coupler is to adjust the width and position of a sufficient number of conductors at each end of the coupler. Each conductor of the coupler may be regarded as a separate reflecting element, and by adjusting their positions and widths it is possible to adjust the relative phases and amplitudes of the reflections from each of the conductors so that their vectorial resultant is sufficiently small over the required bandwidth.

Figures 34, 35:
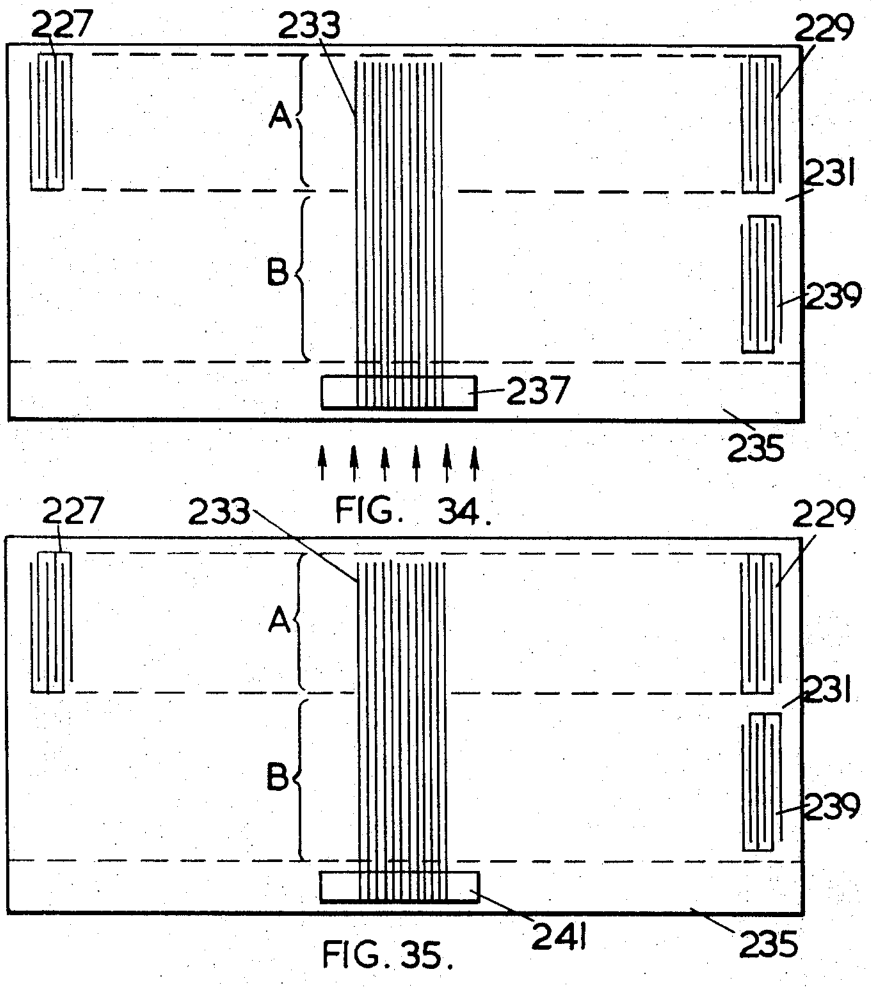
FIG. 34 is a plan view of a light-controlled acoustic surface wave coupler.
FIG. 35 is a plan view of an electrically-controlled acoustic surface wave coupler.

FIG. 34 is a perspective view of a light-controlled acoustic surface wave coupler. Three transducers 227, 229, 239 and a multistrip coupler 233 are deposited on an acoustic surface wave substrate 231 as in the device of FIG. 4, but the coupler 233 is a full-length multistrip coupler and is extended onto a part 235 of the substrate 231 beyond the acoustic surface wave track B. Photoconducting material 237 is deposited by evaporation or otherwise on the part 235 of the substrate 231 either before or after the coupler 233 is deposited.

The action of the device is as follows. If the photoconducting strip 237 is not illuminated then the coupler 233 acts in a similar way to the coupler 5 described above with reference to FIG. 1. However, if the photoconducting strip is illuminated then the conductors in the coupler 233 are short-circuited to each other and their coupling action is thereby inhibited so that some of the acoustic surface wave energy from the transducer 227 is received by the transducer 229. By this means the amount of energy received by the transducer 229 can be controlled by the luminous flux incident on the strip 237 and the energy output of the transducer 229 can be used to measure the luminous flux incident on the strip 237.

FIG. 35 is a plan view of an electrically-controlled acoustic surface wave coupler device. This differs from the device of FIG. 34 in that the photoconducting strip 237 is replaced by an electrical control device 241. The electrical control device 241 may consist of (for example) a plurality of P-I-N diodes, or a plurality of bipolar or field effect transistors; it must be able to connect the conductors in the coupler 233 together electrically under the control of an electric signal.

Figure 36:
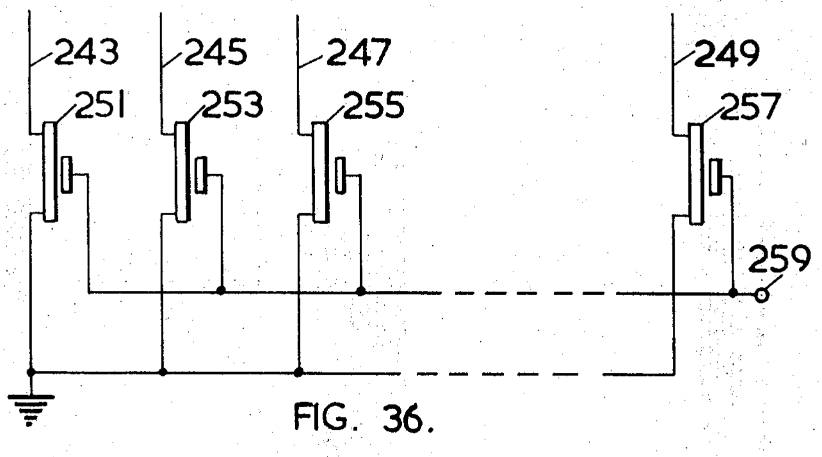
FIG. 36 is a circuit diagram of one form of part of the coupler described with reference to FIG. 35.
Figure 37:
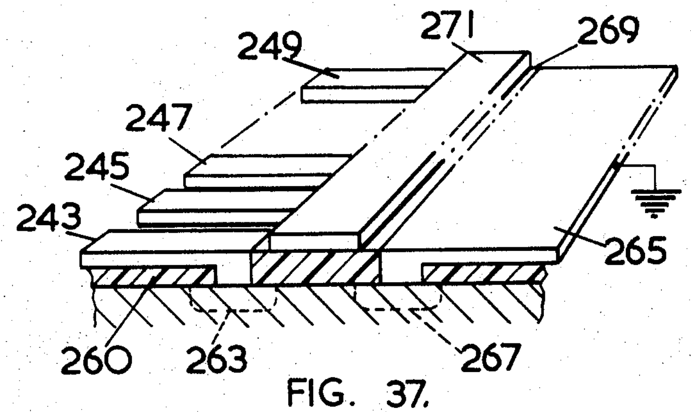

FIG. 36 is a circuit diagram of one possible form for the control devide 241, and FIG. 37 is a perspective view of an integrated circuit form for the device of which FIG. 36 is a circuit diagram. The individual conductors 243, 245, 247, ..., 249 in the coupler 233 are separately connected to the source electrodes of a plurality of MOS transistors 251, 253, 255, ..., 257 respectively. The MOS transistors 251, 253, 255, ..., 257 have their drain electrodes connected together to a ground return connection and their gate electrodes connected together to a terminal 259. By this means a suitable voltage on the terminal 259 can control the transistors and effectively connect all the conductors of the coupler 233 together and to ground.

The physical arrangement of the device 241 shown in FIG. 37 has all the conductors 243, 245, 247, ..., 249 deposited on an insulating layer 260 on a semiconducting substrate 261 and each conductor such as 243 making contact with a separate highly doped portion such as 263 of the substrate 261. A single grounded conducting electrode 265 makes contact with a highly doped portion 267 of the substrate 261. A film 269 of insulating oxide is deposited over the ends of the conductors 243, 245, 247, ..., 249 the edge of the electrode 265 and the interstitial space and a metal strip electrode 271 is deposited over the film 269.

The action of the device is that of a conventional MOS transistor. A control voltage of the correct polarity on the metal strip electrode 271 makes a low impedance connection between the conductors 243, 245, 247, ..., 249 and the grounded electrode 261, grounding them and so preventing coupler action.

Figure 38:
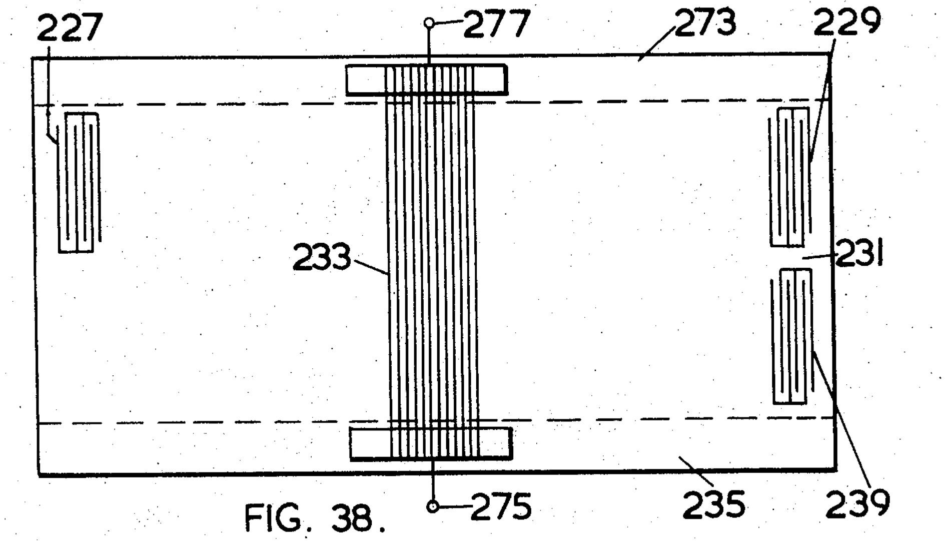
FIG. 38 is a plan view.
Figure 39:
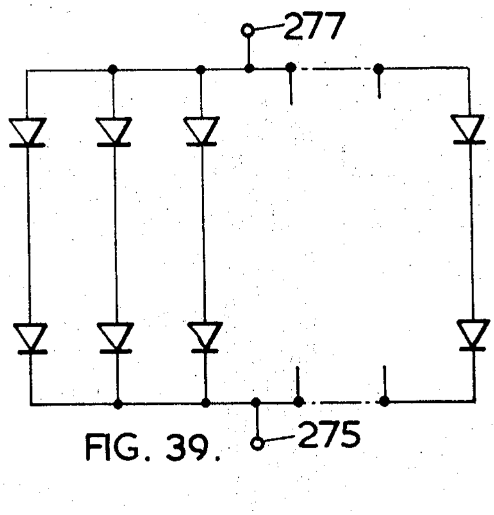
FIG. 39 is a circuit diagram of an alternative electrically-controlled acoustic surface wave coupler.

FIG. 38 is a plan view and FIG. 39 is a circuit diagram of an alternative electrically-controlled acoustic surface wave coupler device. This differs from the device of FIG. 35 only in that the substrate 231 has a part 273 adjacent and parallel to the acoustic surface wave track A on the side remote from the acoustic surface wave track B, and the parts 273 and 235 contain a plurality of variable-capacitance diodes, each conductor in the coupler 233 being connected between a variable-capacitance diode in the part 235 and a variable-capacitance diode in the part 273 connected in the same direction, the terminals of the variable-capacitance diodes in the part 235 remote from the coupler 233 being connected to a common terminal 275 and the terminals of the variable capacitance diodes in the part 273 remote from the coupler 233 being connected to a common terminal 277.

The action of the device is as follows. By applying and varying a voltage between the terminal 275 and the terminal 277 the capacitances between the conductors in the coupler 233 and the terminals 275 and 277 may be varied, and hence the capacitances between the conductors in the coupler 233 themselves. This change in capacitance between the conductors necessarily changes the coupling between them whereby the proportion of energy received by the transducers 229 and 239 is varied in a controllable manner.

I claim:

1. An acoustic surface wave device which comprises at least a first track and a second track, said tracks being formed of a material able to support acoustic surface waves and having first and second piezoelectric regions respectively across both said first and second tracks, means for launching surface acoustic waves along the first track, and means for receiving and detecting acoustic surface wave energy travelling along the second track, said device further comprising acoustic surface wave coupling means extending between said tracks and having a first part disposed across said first track and a second part disposed across said second track, said first and second parts of said coupling means comprising a plurality of spaced filamentary electrical conductors each of which extends in length over the first region and thence without interruption over the second region, those parts of said filamentary conductors which extend across said first region being substantially parallel to one another and being oriented substantially orthogonal to the direction of energy travel along said first track, and those parts of said filamentary conductors which extend across said second region being substantially parallel to one another and being oriented substantially orthogonal to the direction of energy travel along said second track, said coupling means being operative to transfer energy beween said first and second tracks by transduction whereby energy in said first track comprising at least some of the acoustic surface wave energy traveling in the first travck is intercepted and converted into electrical energy induced between said conductors by said first part of the coupling means extending across the first track, is then transferred toward said second track along the filamentary electrical conductors of the coupling means as said electrical energy, and said electrical energy is then converted back to surface acoustic wave energy and relaunched as surface acoustic wave energy in the second track by said second part of the coupling means extending across the second track.

2. An acoustic surface wave device as claimed in claim 1, wherein the said material is a piezo-electric material.

3. An acoustic surface wave device as claimed in claim 1, wherein the said material is an electro-strictive material and the said coupling means also comprises means for applying a biassing electric field to the material under the filamentary conductors in the first region and in the second region.

4. An acoustic surface wave device as claimed in claim 1, wherein the filamentary conductors are connected to form closed loop circuits, and the coupling means also comprises means for maintaining a magnetic field orthogonal to the filamentary conductors over the first region and means for maintaining a magnetic field orthogonal to the filamentary conductors over the second region.

5. An acoustic surface wave device as claimed in claim 1, wherein the said material is a magneto-strictive material which does not shortcircuit the said alternating electric signals, the filamentary conductors are connected to form closed loop circuits, and the coupling means also comprises means for applying a biassing magnetic field to the material in the first region and means for applying a biassing magnetic field to the material in the second region.

6. An acoustic surface wave device as claimed in claim 1 formed on a surface of suitable material, and the said first region and the said second region are different areas of the surface.

7. An acoustic surface wave device as claimed in claim 1 formed on a non-piezoelectric substrate able to support acoustic surface waves, having piezo-electric material deposited to form the said first region and the said second region.

8. An acoustic surface wave device as claimed in claim 1 wherein parts of the said filamentary conductors not over the first region and not over the second region are formed over a material which attenuates or does not support acoustic surface waves.

9. An acoustic surface wave device as claimed in claim 1, wherein the parts of the filamentary conductors over the second region are curved so as to form convergent acoustic surface waves in the second track.

10. An acoustic surface wave device as claimed in claim 1, constructed so that acoustic surface waves propagated from one half of the width of the first transducer means will reach the coupling means a quarter of a period in advance of the acoustic surface waves propagated from the other half of the width of the first transducer means.

11. An acoustic surface wave device as claimed in claim 1, wherein each filamentary conductor has two substantially equal parts, of which one part is a quarter of an acoustic wavelength nearer to the first transducer means than the other part.

12. An acoustic surface wave device as claimed in claim 1, also comprising a third transducer means disposed to launch acoustic surface waves in the second track towards the coupling means, and a fourth transducer means disposed to receive and detect acoustic surface waves propagated from the coupling means in the first track, constructed so that signals launched in phase with each other from the first transducer means and the third transducer means will reach the coupling means in a quadrature phase relationship, and the device will therefore act as a hybrid junction circuit.

13. An acoustic surface wave device as claimed in claim 12, wherein each filamentary conductor has a quarter-wavelength step substantially at its center, effectively advancing one half of the coupling means by a quarter-wavelength in one track, relative to the other half of the coupling means in the other track.

14. An acoustic surface wave device as claimed in claim 1, forming a tapped delay line, comprising a plurality of fractional coupling means extending across successive parts of the first track, and a plurality of transducer means disposed in the second track, comprising one transducer means disposed between each fractional coupling means and the next fractional coupling means.

15. An acoustic surface wave device forming a tapped delay line as claimed in claim 14, having a plurality of deposits of acoustic surface wave attenuating material disposed in the second track between each transducer means and the next fractional coupling means.

16. An acoustic surface wave device forming a tapped delay line as claimed in claim 14, wherein each of the fractional coupling means has its part in its second track disposed at an angle to its part in the first track, so that each fractional coupling means will transfer signals into a distinct track.

17. An acoustic surface wave device comprising a plurality of coupling means as claimed in claim 1, disposed to direct acoustic surface wave signals around a circuit of acoustic surface wave tracks, and at least one additional coupling means for coupling signals in the circuit to a separate track, and an input transducer means and an output transducer means disposed in the said separate track.

18. An acoustic surface wave device, as claimed in claim 1, forming a unidirectional transducer means wherein the said first region and the said second region lie in a common acoustic surface wave track and a transducer means is disposed between the first region and the second region so that signals propagated from the transducer means in opposite directions will reach the coupling means in a quadrature phase relationship with each other.

19. An acoustic surface wave device as claimed in claim 18, wherein the filamentary conductors are U-shaped.

20. An acoustic surface wave device as claimed in claim 18, wherein each filamentary conductor is a separate elongated O shape.

21. An acoustic surface wave device as claimed in claim 1, forming a reflector for acoustic surface waves, wherein the said first region and the said second region lie in a common acoustic surface wave track and the coupling means is a $3dB$ coupler as hereinbefore defined.

22. An acoustic surface wave device forming a track changer, comprising a coupling means as claimed in claim 1 wherein the coupling means is a $3dB$ coupler as hereinbefore defined, and two reflectors are provided on one side of the $3dB$ coupler, one of the reflectors being disposed in the first track and the other being disposed in the second track.

23. An acoustic surface wave device as claimed in claim 1, forming a unidirectional transducer means, wherein the filamentary conductors are separate J shapes, the said first region comprises two equal parts in a common acoustic wave track, and a transducer means is disposed between the two equal parts of the first region so that acoustic surface wave signals propagated from the transducer means in opposite directions will reach the two equal parts of the first region in phase with each other.

24. An acoustic surface wave device as claimed in claim 1, forming a tapped delay line and comprising a plurality of unidirectional transducers wherein the coupling means are fractional coupling means as hereinbefore defined and the long ends of the J-shaped filamentary conductors extend over successive parts of the delay line track.

25. An acoustic surface wave device as claimed in claim 1, wherein the coupling means is a $3dB$ coupler as hereinbefore defined, a third transducer means identical to the second transducer means is provided to receive acoustic surface wave signals passed by the coupling means in the first track, the second and the third transducer means are connected to equivalent circuits, and acoustic surface wave absorbing material is deposited in the part of the second track on the opposite side of the coupling means from the second and third transducer means.

26. An acoustic surface wave delay line device including a track changer as claimed in claim 23 and a reflector.

27. An acoustic surface wave device, forming an amplifying track changer, as claimed in claim 1, wherein the coupling means is a $3dB$ coupler as hereinbefore defined, the second transducer means is a unidirectional transducer, an identical unidirectional transducer is disposed to receive acoustic surface wave signals passed by the coupling means in the first track, and the transducer means of both unidirectional transducers are connected to similar negative-resistance amplifying circuits.

28. An acoustic surface wave device for use as a directional filter comprising a plurality of coupling means as claimed in claim 1, disposed to direct acoustic surface wave signals around a circuit of acoustic surface wave tracks, a plurality of additional coupling means extending over separate parts of the circuit, an input transducer means for launching acoustic surface wave signals towards one of the additional coupling means, and at least one output transducer means disposed for receiving acoustic surface wave signals from one of the additional coupling means.

29. An acoustic surface wave device as claimed in claim 1 wherein there are two separate coupling means each extending over the first track and the second track, and a region of controllable acoustic velocity is formed in one of the tracks between the two separate coupling means.

30. An acoustic surface wave device as claimed in claim 1 wherein successive filamentary conductors of the coupling means are of linearly decreasing length, for beam-splitting antisymmetric mode signals.

31. An acoustic surface wave device as claimed in claim 1, wherein the leading filamentary conductors of the coupling means are V-shaped, with angles which are successively increased towards 180°.

32. An acoustic surface wave device as claimed in claim 1, wherein the leading filamentary conductors of the coupling means increase monotonically in length.

33. An acoustic surface wave device as claimed in claim 1, wherein the filamentary conductors of the coupling means also extend over a region of controllable electrical impedance.

34. An acoustic surface wave device as claimed in claim 34; wherein the said region of controllable electrical impedance is formed of a photoconductive material.

35. An acoustic surface wave device as claimed in claim 1, wherein the filamentary conductors of the coupling means are electrically connected to an array of field effect transistors.

36. An acoustic surface wave device as claimed in claim 1, wherein two arrays of diodes are connected to opposite ends of the filamentary conductors, thereby forming a plurality of connections each comprising two diodes connected in series by a filamentary conductor of the coupling means.

* * * * *